(12) United States Patent
Hicks, III et al.

(10) Patent No.: US 7,657,270 B2
(45) Date of Patent: Feb. 2, 2010

(54) SYSTEM AND METHOD FOR PROVIDING A SINGLE TELEPHONE NUMBER FOR USE WITH A PLURALITY OF TELEPHONE HANDSETS

(75) Inventors: John A. Hicks, III, Roswell, GA (US); Gregory N. Patterson, Atlanta, GA (US); William L. Smith, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 10/614,751

(22) Filed: Jul. 7, 2003

(65) Prior Publication Data

US 2004/0248593 A1 Dec. 9, 2004

Related U.S. Application Data

(60) Provisional application No. 60/476,743, filed on Jun. 6, 2003, provisional application No. 60/495,843, filed on Jun. 23, 2003.

(51) Int. Cl.
*H04W 4/00* (2009.01)

(52) U.S. Cl. .................. 455/461; 379/211.04; 455/462

(58) Field of Classification Search ......... 455/461–463, 455/465, 517, 518, 414.1, 415, 416, 417, 455/567, 445; 379/211.01, 211.02, 211.04
See application file for complete search history.

(56) References Cited

U.S. PATENT DOCUMENTS

| | | | |
|---|---|---|---|
| 5,127,042 A | 6/1992 | Gillig et al. | ............... 455/552.1 |
| 5,594,782 A | 1/1997 | Zicker et al. | |
| 5,875,404 A | 2/1999 | Messiet | |
| 5,915,220 A | 6/1999 | Chelliah | ................... 455/435.2 |
| 5,915,224 A | 6/1999 | Jonsson | .................... 455/552.1 |
| 6,081,726 A | 6/2000 | Baek | .......................... 453/463 |

(Continued)

FOREIGN PATENT DOCUMENTS

WO    WO9731434 A1    8/1997

OTHER PUBLICATIONS

U.S. Appl. No. 10/614,744, filed Jul. 7, 2003, entitled "System and Method for Providing Integrated Voice and Data Services Utilizing Wired Cordless Access with Unlicensed/Unregulated Spectrum and Wired Access with Licensed/Regulated Spectrum", Inventors: Hicks et al.

(Continued)

*Primary Examiner*—Patrick N Edouard
*Assistant Examiner*—Anthony S Addy

(57) ABSTRACT

Systems and methods providing integrated voice and data services utilizing wired cordless access with unlicensed/unregulated connectivity sources and wireless access with licensed/regulated connectivity sources. A single telephone directory number is assigned for use with both a mobile wireless telephone and for use with a cordless wired Internet Protocol (IP) telephone. The mobile wireless telephone operates via a conventional licensed spectrum wireless network, and the IP telephone operates over voice over Internet protocol (VoIP) over a broadband packet data network service. Incoming calls simultaneously ring the user's mobile wireless telephone and IP telephone. The user may be provided a personal voice mailbox that may be accessed from their mobile wireless telephone or from their IP telephone. The user may be provided a single services bill associated with use of both telephones.

41 Claims, 10 Drawing Sheets

U.S. PATENT DOCUMENTS

| | | | | |
|---|---|---|---|---|
| 6,097,804 | A | | 8/2000 | Gilbert et al. ............... 379/230 |
| 6,141,556 | A | * | 10/2000 | Dougherty et al. .......... 455/445 |
| 6,259,782 | B1 | * | 7/2001 | Gallant .................. 379/211.01 |
| 6,373,817 | B1 | * | 4/2002 | Kung et al. .................. 370/217 |
| 6,404,764 | B1 | | 6/2002 | Jones et al. .................. 370/352 |
| 6,434,394 | B1 | * | 8/2002 | Grundvig et al. ............ 455/463 |
| 6,449,483 | B1 | * | 9/2002 | Akhteruzzaman et al. ... 455/445 |
| 6,611,692 | B2 | | 8/2003 | Raffel et al. ................. 320/115 |
| 6,681,118 | B2 | | 1/2004 | Raffel et al. ............. 455/552.1 |
| 6,763,226 | B1 | | 7/2004 | McZeal, Jr. ................. 455/90.2 |
| 6,766,160 | B1 | | 7/2004 | Lemilainen et al. ......... 455/411 |
| 6,826,174 | B1 | | 11/2004 | Erekson et al. ............. 370/352 |
| 6,829,477 | B1 | | 12/2004 | Lu et al. |
| 6,829,481 | B2 | | 12/2004 | Souissi ....................... 455/436 |
| 6,853,851 | B1 | | 2/2005 | Rautiola et al. .......... 455/553.1 |
| 6,865,372 | B2 | | 3/2005 | Mauney et al. ............. 455/41.2 |
| 6,868,072 | B1 | | 3/2005 | Lin et al. .................... 370/276 |
| 6,876,852 | B1 | | 4/2005 | Li et al. |
| 6,922,559 | B2 | * | 7/2005 | Mohammed ................ 455/421 |
| 6,970,474 | B1 | | 11/2005 | Sinha ......................... 370/401 |
| 6,978,003 | B1 | * | 12/2005 | Sylvain ................. 379/211.02 |
| 7,039,027 | B2 | | 5/2006 | Bridgelall |
| 7,107,620 | B2 | * | 9/2006 | Haverinen et al. ............ 726/29 |
| 7,200,112 | B2 | | 4/2007 | Sundar et al. |
| 7,215,959 | B2 | | 5/2007 | Creamer et al. |
| 7,277,724 | B2 | | 10/2007 | Jones et al. |
| 7,369,856 | B2 | | 5/2008 | Ovadia |
| 7,406,324 | B1 | | 7/2008 | McConnell |
| 7,466,991 | B2 | | 12/2008 | Everson et al. |
| 7,502,615 | B2 | | 3/2009 | Wilhoite et al. |
| 2002/0116464 | A1 | | 8/2002 | Mak .......................... 709/206 |
| 2002/0137500 | A1 | | 9/2002 | Brooking et al. ............ 455/419 |
| 2002/0141390 | A1 | | 10/2002 | Fangman et al. ............ 370/352 |
| 2002/0147008 | A1 | | 10/2002 | Kallio |
| 2002/0157007 | A1 | | 10/2002 | Sashihara .................... 713/183 |
| 2003/0039242 | A1 | | 2/2003 | Moore ........................ 370/354 |
| 2003/0134658 | A1 | | 7/2003 | Kaminski et al. ........... 455/552 |
| 2003/0139180 | A1 | | 7/2003 | McIntosh et al. ............ 455/426 |
| 2004/0017901 | A1 | | 1/2004 | Lim ........................ 379/93.09 |
| 2004/0030791 | A1 | | 2/2004 | Dorenbosch et al. ........ 709/230 |
| 2004/0072593 | A1 | * | 4/2004 | Robbins et al. .............. 455/560 |
| 2004/0114603 | A1 | | 6/2004 | Suhail et al. ............. 370/395.5 |
| 2004/0141484 | A1 | | 7/2004 | Rogalski et al. ............. 370/338 |
| 2004/0146021 | A1 | | 7/2004 | Fors et al. |
| 2004/0203788 | A1 | | 10/2004 | Fors et al. .................... 455/439 |
| 2004/0219948 | A1 | * | 11/2004 | Jones et al. .............. 455/552.1 |
| 2004/0229634 | A1 | * | 11/2004 | Bushnell et al. ............. 455/461 |
| 2005/0070272 | A1 | * | 3/2005 | Marangos ................ 455/426.2 |
| 2005/0286501 | A1 | | 12/2005 | Higuchi |
| 2007/0083470 | A1 | | 4/2007 | Bonner et al. |
| 2007/0153736 | A1 | | 7/2007 | Mow et al. |

OTHER PUBLICATIONS

U.S. Appl. No. 10/614,737, filed Jul. 7, 2003, entitled "System and Method for Providing Integrated Voice and Data Services Utilizing Wired Cordless Access with Unlicensed/Unregulated Spectrum", Inventors: Hicks et al.

U.S. Appl. No. 11/041,604, filed Jan. 24, 2005, entitled "System and Method for Providing Integrated Voice and Data Services Utilizing Wired Cordless Access with Unlicensed Spectrum and Wired Access with Licensed Spectrum", Inventors: Hicks et al.

USPTO Official Action issued May 4, 2005 on U.S. Appl. No. 10/614,744, filed Jul. 7, 2003, entitled "System and Method for Providing Integrated Voice and Data Services Utilizing Wired Cordless Access with Unlicensed/Unregulated Spectrum and Wired Access with Licensed/Regulated Spectrum", Inventors: Hicks et al.

U.S. Final Official Action dated Jan. 30, 2006 cited in U.S. Appl. No. 10/614,744.

U.S. Appl. No. 11/513,720, filed Aug. 31, 2006 entitled "Communication Environment Switchover".

U.S. Appl. No. 11/234,951, filed Sep. 26, 2005 entitled "System and Method for Providing Integrated Voice and Data Services Utilizing Wired Cordless Access with Unlicensed Spectrum and Wired Access with Licensed Spectrum".

U.S. Final Official Action dated Jan. 30, 2006 cited in U.S. Appl. No. 10/614,744.

U.S. Official Action dated Oct. 2, 2006 cited in U.S. Appl. No. 10/614,744.

U.S. Official Action dated Oct. 10, 2007 cited in U.S. Appl. No. 11/234,951.

U.S. Final Official Action dated May 15, 2007 cited in U.S. Appl. No. 10/614,744.

U.S. Official Action dated Sep. 27, 2007 cited in U.S. Appl. No. 10/614,737.

U.S. Official Action dated Oct. 30, 2007 cited in U.S. Appl. No. 10/614,744.

U.S. Final Office Action dated Mar. 31, 2008 cited in U.S. Appl. No. 10/614,737.

U.S. Official Action dated Jan. 11, 2008 cited in U.S. Appl. No. 11/041,604.

U.S. Office Action dated Mar. 14, 2008 cited in U.S. Appl. No. 11/234,951.

U.S. Final Office Action dated Jun. 16, 2008 cited in U.S. Appl. No. 10/614,744.

U.S. Office Action dated Jul. 11, 2008 cited in U.S. Appl. No. 11/041,604.

Office Action dated Mar. 6, 2008 cited in U.S. Appl. No. 11/234,951.

Office Action dated Jan. 22, 2009 cited in U.S. Appl. No. 10/614,744.

Office Action dated Sep. 5, 2008 cited in U.S. Appl. No. 10/614,737.

Final Office Action dated Mar. 17, 2009 cited in U.S. Appl. No. 10/614,737.

Office Action dated Jan. 29, 2009 cited in U.S. Appl. No. 11/041,604.

Office Action dated Dec. 10, 2008 cited in U.S. Appl. No. 11/234,951.

OA mailed Mar. 25, 2009 for U.S. Appl. No. 11/513,720, 28 pages.

Final OA mailed Mar. 17, 2009 for U.S. Appl. No. 10/614,737, 34 pages.

Final OA mailed Jun. 19, 2009 for U.S. Appl. No. 11/234,951, 21 pages.

* cited by examiner

SYSTEM AND METHOD FOR PROVIDING A SINGLE TELEPHONE NUMBER FOR USE WITH A PLURALITY OF TELEPHONE HANDSETS

CROSS REFERENCE TO RELATED APPLICATIONS

The present application claims priority from U.S. provisional application No. 60/476,743 entitled "System for Providing Integrated Voice and Data Services Utilizing Wired Cordless Access with Unlicensed Spectrum," filed Jun. 6, 2003 and U.S. provisional application No. 60/495,843 entitled "System for Providing Integrated Voice and Data Services Utilizing Wired Cordless Access with Unlicensed/Unregulated Spectrum," filed Jun. 23, 2003, said applications incorporated herein by reference.

FIELD OF THE INVENTION

This invention relates to communications services via licensed/regulated and unlicensed/unregulated connectivity sources. More particularly, this invention relates to utilization of a single telephone directory number for communication with a mobile wireless communication device over licensed/regulated wireless connectivity source and with a cordless wired communication device a over an unlicensed/unregulated wireless connectivity source.

BACKGROUND OF THE INVENTION

The benefits of mobility have motivated a majority of the U.S. population to obtain cellular or other wireless mobile telephone services operated through licensed and regulated connectivity sources (licensed spectrum). One of the major reasons that a large portion of the population does not have wireless mobile telephone service is that they do not perceive a need for the service. In addition, wireless mobile service is viewed as being an expensive and somewhat complicated service from the perspective of billing plans. On the other hand, a very high percentage of households and businesses that do not have wireless mobile telephone service do have cordless telephones. Such cordless telephones typically include a base station wired to a local telephone service provider and one or more cordless telephone handsets. Accordingly, a user of such a cordless telephone may walk through the home or business utilizing the cordless telephone just as the user might use a mobile wireless telephone outside the home or business.

Telephone services users who do utilize mobile wireless telephones and wireline telephones typically have separate telephone directory numbers for each telephone. Accordingly, such users receive separate telephone services bills for their mobile wireless services and for their wireline services. In most cases, users also have different features and functions, such as voicemail services, associated with each different telephone. With the continued growth of mobile wireless telephone services usage, many users have begun to treat mobile wireless telephones as their primary telephone, but in many areas the quality of mobile wireless telephone service coverage is inadequate when users enter certain geographical areas or when they enter buildings, including homes and public buildings.

Accordingly, there is a need for a system and method for integrating wireless and wireline voice services via a single telephone directory number for use with a mobile wireless telecommunications device over a licensed/regulated connectivity source and for use with a wireline telecommunications service over an unlicensed/unregulated connectivity source. It is with respect to these and other considerations that the present invention has been made.

SUMMARY OF THE INVENTION

Embodiments of the present invention provide systems and methods for providing integrated voice and data services utilizing wired cordless access with unlicensed/unregulated connectivity sources and wireless access with licensed/regulated connectivity sources. According to one aspect of the present invention, a consumer may be provided a single telephone directory number for use with a mobile wireless telephone when they are outside of their home or business and for a wired or cordless wired voice over Internet protocol (VoIP) telephone when they are in their home or business. The VoIP telephone operates over voice over Internet protocol (VoIP) over a broadband packet data network service, such as is provided via DSL and cable-modem services, with a packet data connection to a wireless network. Incoming calls simultaneously ring the consumer's mobile wireless telephone and VoIP telephone. The consumer may be provided a personal voice mailbox that may be accessed from their mobile wireless telephone or from their VoIP telephone in their home or business. The consumer may be provided a single services bill associated with the integrated wireless/wireline service.

According to another aspect of the invention, the single telephone directory number may be associated with multiple users per household or business. Each user may have a personal wireless mobile telephone and a personal telephone directory number. Each user's telephone directory number may be assigned to a dedicated VoIP derived line in their home or business. Incoming calls to users will ring on the appropriate VoIP derived line with a called party identification or distinctive ring to allow respective users to distinguish to whom an incoming call is directed. Internet Protocol phones according to the present invention may receive and place telephone calls on every VoIP derived line in their home or business.

According to another aspect of the invention, a calling party places a call to a called party, and the telephone call is received at a PSTN central office switch which sends a query message to an intelligent network component. The intelligent network component instructs the central office switch to route the call to a services node. The services node places a first outgoing call to the subscriber's cordless VoIP telephone handset. The services node places a second outgoing call to the subscriber's mobile wireless telephone. If the called party's VoIP telephone answers first, the services node connects the calling party to the VoIP telephone via the Internet Protocol (IP) address of the called party. The services node then drops the second outgoing call and transfers the first call to the central office switch for continued connection between the calling party and the called party via the called party's VoIP telephone. On the other hand, if the called party's mobile wireless telephone answers first, the services node connects the calling party to the called party's mobile wireless telephone via a wireless telecommunications network. The services node then drops the first outgoing call and transfers the second call to the central office switch for continued communication between the calling party and the called party via the called party's mobile wireless telephone. If neither of the telephones is answered, the services node drops both calls.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

Embodiments of the present invention are directed to methods and systems for operation of a digital cordless telephone (handset) via a voice over Internet protocol (VoIP) and data over Internet protocol through a wired data network via an unregulated wireless network by access though one or more wireless access points. In the following detailed description, references are made to the accompanying drawings that form a part hereof and in which are shown by way of illustration specific embodiments or examples. These embodiments may be combined, other embodiments may be utilized, and structural changes may be made without departing from the spirit or scope of the present invention. The following detailed description is, therefore, not to be taken in a limiting sense and the scope of the present invention is defined by the appended claims and their equivalents.

Figure 1:
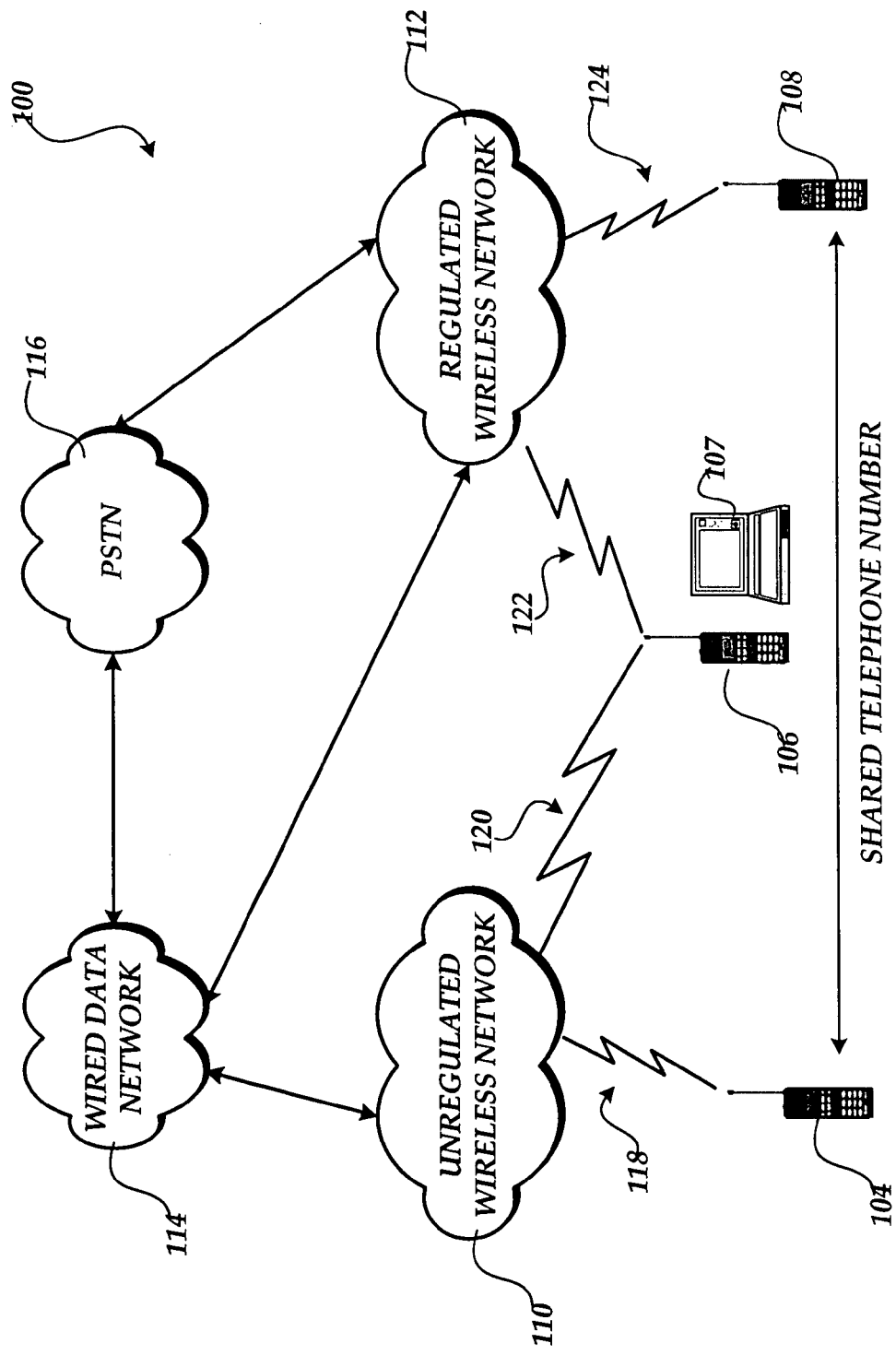
FIG. 1 is a simplified block diagram illustrating interaction between a wired data network, an unregulated wireless network, a regulated wireless network, and a public switch telephone network, through which communications may be operated according to embodiments of the present invention.

Referring now to the drawings in which like numerals represent like elements through the several figures, aspects of the present invention and the exemplary operating environment will be described. FIG. 1 is a simplified block diagram illustrating interaction between a wired data network, an unlicensed/unregulated wireless network, a licensed/regulated wireless network and a public switch telephone network, through which communications may be operated according to embodiments of the present invention. As described in further detail below, according to embodiments of the present invention, a digital cordless telephone or handset 104 is operative to communicate via an unregulated/unlicensed wireless network 110 comprised of one or more locally or geographically disbursed wireless access points through which a user of the telephone 104 may communicate with voice and data services through VoIP via a wired data network 114. Communications from the telephone 104 through the wired data network 114 via VoIP may subsequently be communicated to other communications receivers through a public switch telephone network 116 or through a regulated wireless network 112, such as a typical cellular telephone communications system.

A telephone services provider may position wireless access points in homes, businesses, schools, leisure activity centers and the like. A user of the digital cordless telephone 104 may operate the telephone anytime the user is in range of the wireless access point of the unregulated wireless network 110. Thus, the user may send and receive calls via the telephone 104 if the user is in her home, business, grocery store, school, and the like so long as her services provider has positioned wireless access points in those facilities through which the user may communicate VoIP communications through the wired data network 114 to other communication sources. As will be described in detail below, the user may also send and receive non-voice data services communications via the telephone 104 which may also comprise a computer implemented for data and voice communications, or other computing devices such as hand held computing devices, and personal digital assistants (PDA).

According to another embodiment of the present invention, a conventional wireless telephone handset 108 is provided for communications via wireless signaling 124 to a regulated wireless network 112. Communications through the regulated wireless network 112, such as a conventional cellular telephone network, may be passed through the public switch telephone network 116; a wired data network 114 and through to a user of the aforementioned digital cordless telephone 104 through the unregulated wireless network 110. According to an embodiment of the present invention, a single shared telephone number may be assigned to both the digital cordless telephone 104 and the conventional wireless telephone 108. Telephone calls placed to the single assigned telephone directory number ring both the digital cordless telephone 104 and the conventional wireless telephone 108 so that the user of both telephones may be reached by either telephone without the need for separate telephone directory numbers and separate billing invoices.

According to another embodiment of the present invention, a dual mode telephone 106 is provided for operating through both the unregulated wireless network via wireless access points, described above, and for operating via a regulated wireless network 112, as described above. When the telephone handset 106 is moved into range of one or more wireless access points to allow the telephone to communicate over the unregulated wireless network 110, the telephone 106 transitions into the mode previously described for the digital cordless telephone 104. On the other hand, when the telephone 106 is moved out of range of one or more wireless access points for communication through the unregulated wireless network 110, the telephone 106 automatically transitions into a regulated wireless mode for communication through the regulated wireless network 112, as described above for the telephone 108. Advantageously, a single telephone 106 may be utilized for both regulated wireless communications and unregulated wireless communications through a wired data network 114.

For purposes of the description that follows, communication to and from any wireline or wireless telephones 104, 106, 108, 308 includes, but is not limited to, telephone devices that may communicate via a variety of connectivity sources, including wireline, wireless, voice and data over Internet protocol, wireless fidelity (WiFi), ultra wide band communications and satellite communications. A computer 107 is illustrated for digital data services via the unregulated wireless network 110 through the wired data network 114, as described above. The computer 107 is also illustrative of other mobile digital devices (hereafter MDD) such as personal digital assistants (PDA), instant messaging devices, voice and data over Internet protocol devices, communication watches or any device allowing digital and/or analog communication over a variety of connectivity means described herein.

Figure 2:
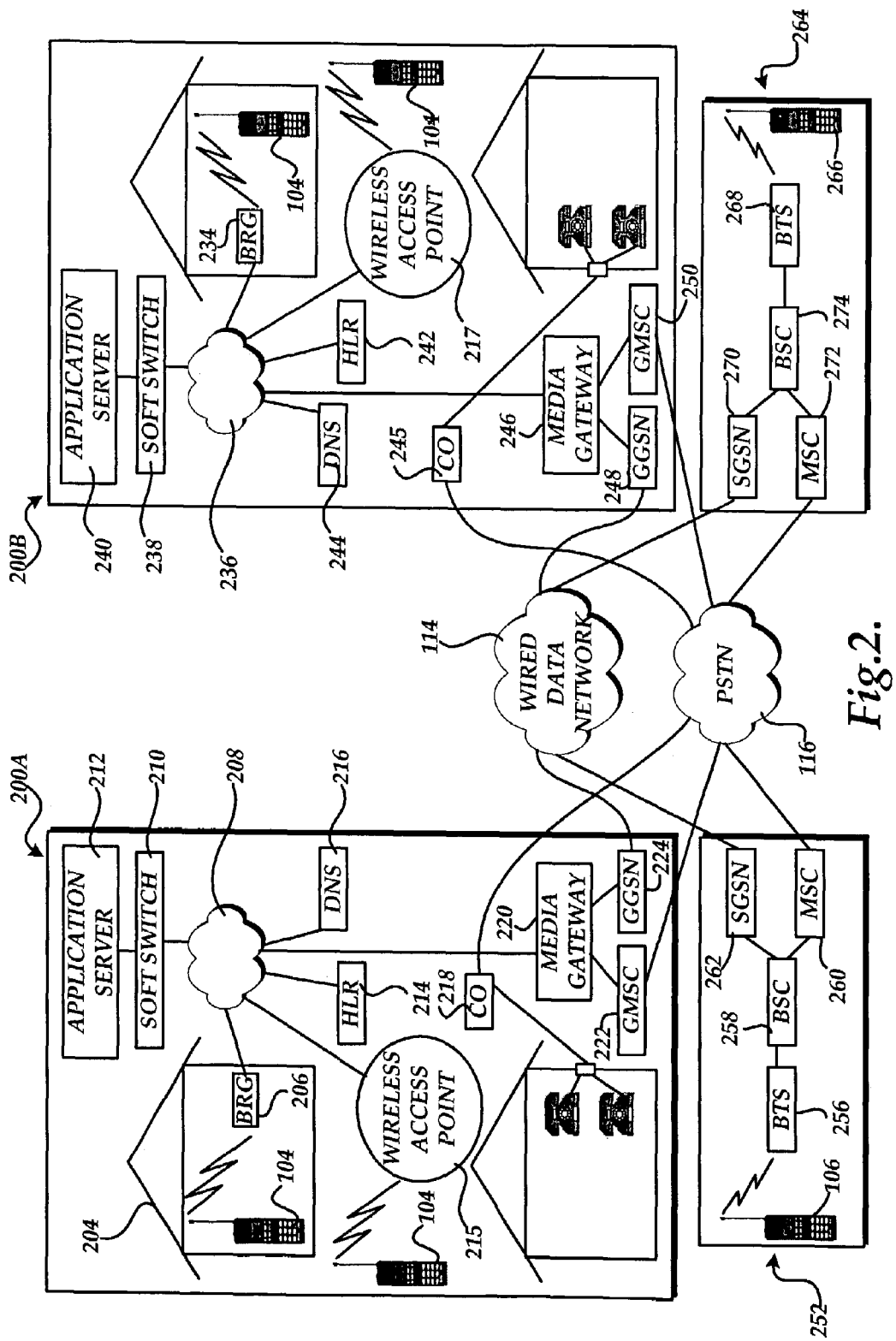
FIG. 2 is a block diagram showing a communications service architecture for communicating via a VoIP and wireline telecommunications according to embodiments of the present invention.

FIG. 2 is a block diagram showing a communications service architecture for communicating via a voice over Internet protocol and wireline telecommunications according to embodiments of the present invention. A first architecture 200A is provided for a first service provider while a second architecture 200B that mirrors the first service provider is provided for a second service provider. A digital cordless phone 104 and a dual mode telephone 106 (FIG. 3) within the first architecture 200A operates in conjunction with a wireless access point 215 or broadband residential gateway ("BRG") 206 over a wireless connection that is unlicensed and/or unregulated by the Federal Communications Commission of the United States or a similar regulation body of other nations. For example, the FCC may regulate wireless connections by requiring that spectrum be licensed for use by the party utilizing the spectrum. However, certain wireless connections may be unregulated in that the frequencies of the connection may be used without license from the regulating body at any range. These frequencies that are used may be used without license from the regulating body so long as the range is below a particular threshold due to limitations on the transmitting power, or for other similar reasons. Examples of such unregulated wireless connectivity include the Institute of Electrical and Electronics Engineers ("IEEE") 802.11b standard and Bluetooth®.

The service provider may operate as a Public Land Mobile Network (PLMN) operator when using the unregulated wireless connection between the digital cordless handset 104 and wireless access point 215 or BRG 206. A single service provider may provide for both the wired data network and the PLMN over the wireless connection, and may provide for additional networks as well including a PSTN 116.

The wireless access point 215, which is used in conjunction with the digital cordless phone 104 to form the wireless network, may be wired to a wired data network such as by having a wired connection between the wired access point 215 and a gateway. The gateway has a wired connection back to the remainder of the wired data network. For example, the gateway may be a broadband digital subscriber line (DSL) or cable modem. As shown in FIG. 2, the wireless access point may be incorporated into a BRG 206 that is a single box of a residence 204, place of business, or other public and private locations and that incorporates the broadband modem as well as the wireless access point. The BRG 206 may also incorporate a router function so that broadband access may be provided to multiple wireless access points and/or multiple wired access points, which is discussed in more detail below with reference to FIG. 3.

The BRG 206 communicates with a first portion 208 of a wired network that includes various functions that provide for the voice and data services to the digital cordless handset 104. For example, the first portion 208 may provide a home location register (HLR) 214 that maintains information for each subscriber to the voice and data services provided to the digital cordless handsets 104. The information may include identification information for the user that may be used to verify the legitimacy of an attempt to access the service and may also store an identification of the features applicable for each legitimate user. A domain name server (DNS) 216 may be provided as well as other standard network servers to provide for Internet services to communications devices linked to the BRG 206 or wireless access point 215.

The digital cordless handset 104 may contain a Subscriber Identity Module (SIM) card that stores the identity of the user and the identity of the service provider of the user. Thus, when the user attempts to access voice and data services by using the digital cordless handset 104 within range of a wireless access point 215 or BRG 206, the identification information is obtained from the SIM card and may be compared to the information of the HLR 214 to determine whether to permit voice and data services to the handset 104 and to determine what features should be provided to the user of the handset 104.

The first portion 208 of the wired data network is also linked to a softswitch 210 which connects to an application server 212. As is needed for a particular situation, the softswitch 210 interconnects the application server 212 to the digital cordless handset 104 to provide various features of the voice and data services as dictated by the information maintained by the HLR 214. For example, the user of the digital cordless handset may subscribe to messaging and/or directory services that are provided from the application server 212. For example, voicemail may be maintained for the user on the application server 212. Furthermore, white pages and yellow pages directories may be accessible by the cordless handset 104 from the application server 104. Additionally, as discussed below in relation to FIG. 3, restrictions on use of the handset 104 may be defined and implemented by the application server 212 to limit the amount of calls or time per call for particular users such as children.

The first portion 208 of the wired data network is linked by a media gateway 220 to downstream devices. The media gateway 220 exchanges voice communication with a gateway mobile switching center (GMSC) 222 which exchanges the voice communication with the PSTN 116. This allows voiced telephone calls to be established between the digital cordless handset and telephones remotely located on the PSTN 116 through central offices (CO) 218. Likewise, the media gateway 220 exchanges data communications with a gateway general packet radio service (GPRS) service node (GGSN). The GGSN exchanges data communications with the remainder of the wired data network 114, such as the global Internet. This allows data communications to occur between devices connected to the wireless access point 215 or BRG 206 and the remainder of the wired data network 114.

The voice communications provided through the digital cordless handset are of a format suitable for delivery over at least the first portion 208 of the wired data network. An example of such a voice communication protocol is voice over Internet protocol (VoIP). The VoIP protocol allows for packetized transfer and routing of packets containing data representative of voice. Thus, the digital cordless handset 104 exchanges voice communication through the first portion 208 of the wired data network and with the downstream media gateway 220 and subsequent devices by exchanging VoIP packets to establish bi-directional communication. The VoIP incoming and outgoing calls may be established by use of the Session Initiation Protocol (SIP). The SIP may be stored on the SIM card so that the card may be moved from one handset 104 to another or to a laptop or other computing device equipped with audio capabilities to allow the user to be identified and place VoIP calls from the chosen device.

The data communications provided through the digital cordless handset are also of a format suitable for delivery over the first portion 208 of the wired data network and through subsequent downstream data network devices. Accordingly, such data communications may also be packetized data transmissions that utilize a network routing scheme such as Internet Protocol (IP).

The VoIP and IP communications from the digital cordless handset 104 may be further encapsulated in frames for the lower levels of a communications protocol stack. Thus, for example, there may be Ethernet frames encoded within DSL frames between the BRG 206 or wireless access point 215 and the wired data network portion 208. These Ethernet frames encoded within DSL frames carry the VoIP and IP packets and establish bi-directional communication between the digital cordless handset 104 and at least the wired network portion 208.

To initially begin communications with a digital cordless handset 104, 106, the handset 104, 106 must be registered as a communications device with the wireless access point 215 or BRG 206. Generally described, when a telephone 104, 106 enters the range of a wireless access point 215, the telephone 104, 106 detects the unlicensed connectivity source (e.g. 802.11b, Bluetooth, and the like) and registers with the wired data network via the wireless access point 215 to allow the telephone 104, 106 to engage in digital communications over the wired data network 114. A mobility management function may be utilized for managing the transition of the telephones 104, 106 onto the wired data network 114 via the wireless access points 215 or the transition from the telephones 104, 106 from a licensed spectrum network to the wired data network via unlicensed spectrum via the wireless access points 215. The mobility management function may be a software module resident on the application server 212, 240, or the mobility management function may reside on a separate authentication, accounting and authorization (AAA) system accessible via the digital network portions 208, 236 for managing user access to the wired data network 114 described herein.

According to one example method of transitioning the telephone 104, 106 onto the wired data network via the wireless access points, the digital cordless handset 104, 106 may be provided with a medium access control (MAC) address that is broadcast from the handset 104 to the BRG 206 or wireless access point 215 over the unregulated wireless connection. The digital cordless handset 104 is then assigned an IP address that is associated with the MAC address of the handset 104. This allows communications from the wired data network 208 destined for the IP address assigned to the handset 104 to be properly delivered to the handset having the MAC address associated with the assigned IP address. According to another example method of transitioning the telephone 104, 106 onto the wired data network via the wireless access points, a registration and authentication process, such as Radius authentication, may be used where a user of the telephone 104, 106 is required to provide a user name and password for access via the wireless access points 215 to the wired data network 114. As should be understood, a user name and password may be stored in the telephone 104, 106 so that the user does not have to enter the user name and password each time access is desired.

During use, the digital cordless handset 104 may move from an area serviced by one wireless access point 215 to an area serviced by another wireless access point. For example, a user may be using the handset 104 through the BRG 206 at home and then travel to a shopping center where the handset 104 operates through the wireless access point 215. This transition may be seamless by the use of conventional hand-off procedures where the two areas are not separated by a dead zone lacking adequate signal. Thus, the wired data network portion 208 detects the presence of the cordless handset 104 in one area as reported by the wireless access point for that area and then detects the presence of the cordless handset 104 in another area. As discussed above, this may be done by a recognition of the MAC address being broadcast by the handset device that is received upon the handset device entering a particular area serviced by a wireless access point 215 or BRG 206. Thus, when the handset 104 transitions from one area to the next, the new area receives the broadcast MAC address and the wired data network 208 receives indication that the IP address assigned to the MAC address corresponds to the new wireless access point. The VoIP and IP communications with the handset 104 may then continue in the new area by routing packets accordingly.

The transition may not always be continuous. For example, there may be instances where the handset 104 travels from one service area to another with a break in service between the two areas due to a dead zone where signal is not available. However, upon the handset 104 entering a new area serviced by a BRG 206 or wireless access point 215, the handset 104 is again detected according to a MAC address and the IP, and VoIP packets for the handset 104 may then be exchanged with the new area. Regardless of whether the transition results in a break in service, the handset 104 may operate among any or all of the wireless access points 215 and/or BRGs 206 that are made available by the service provider for the user.

The architecture 200B for the second service provider mirrors that of the architecture 200A for the service provider of the user. Accordingly, the digital cordless handset 104 may be used within the architecture 200B for the second service provider as well as the first architecture 200A. Thus, the user of the digital cordless handset 104 may transition from an area covered by architecture 200A being serviced by the service provider of the user to an area being covered by architecture 200B being serviced by another service provider.

The architecture 200B contains an application server 240 for providing any enhanced services to subscribers and to guest users entering the service area of architecture 200B. The application server 240 is linked to a wired data network portion 236 through a softswitch 238. BRGs 234 and wireless access points 217 are wired to the data network portion 236. The data network portion 236 communicates with the downstream media gateway 246 to transfer voice communications through the GMSC 250 to the PSTN 116 and to transfer data communications through the GGSN to the remainder of the wired data network 114. A CO 245 links conventional PSTN phones of the area covered by architecture 200B to the PSTN 116. According to one embodiment, digital VoIP communication may be made directly from a telephone 104 and telephones 106, 304A, 304B (FIG. 3) from the data network portion 208 through the wired data network 114 and to the data network portion 236 to other digital telephones 104, 106, 304A, 304B.

The wired data network portion 236 may also provide various other data network servers to assist in providing the voice and data services to the users and guest users of the architecture 200B. The DNS server 244 may provide for Internet related services. The HLR 242 may provide for the determination of the legitimacy and available features for the cordless handset users. However, for guest users who have transitioned from their home service provider's area to the area covered by architecture 200B of another service provider, then the HLR 242 may also provide a Visitor Location Register (VLR) function. The VLR queries back to the home network of the guest user to determine the credentials of and features available to the guest user by retrieval of information from the HLR 214 of the guest user's home network. Accordingly, when the guest user enters the area covered by the second service provider, the identity of the guest user may be obtained form the SIM card of the handset 104 and verified by the VLR function prior to allowing voice and data services to be provided.

A first wireless network architecture 252 is illustrated for communicating calls placed thought the regulated wireless network 112, described above with reference to FIG. 1. A second wireless network architecture 264 is illustrated that mirrors the architecture 252 such as would be provided by a different wireless communications services provider from the services provider operating the network architecture 252. Dual mode telephones 106, 266 are illustrated for wireless communication through the wireless networks 252, 264 through a regulated wireless network 112. It should be appreciated that the telephone 106, 266 may also be in the form of conventional wireless telephone 108 for communication through the regulated wireless network 112 only. A wireless network architecture 252, 264 includes a base transceiver station 256, 268, a base station controller 258, 274 and mobile switching centers 260, 272 for communicating wireless transmissions from the telephone 106, 266 from the regulated wireless network 112 to the public switch telephone network 116 and the wired data network 114. A serving general packet radio service node 262, 270 is also illustrated in the wireless network architecture 252, 264 for processing data communications from the telephones 106, 266 through the wireless network 112 to the wired data network 114. It should be appreciated that the dual mode telephone 106 may operate through the wired data network 114 via wireless access points in the manner described above for the telephone 104

Figure 3:
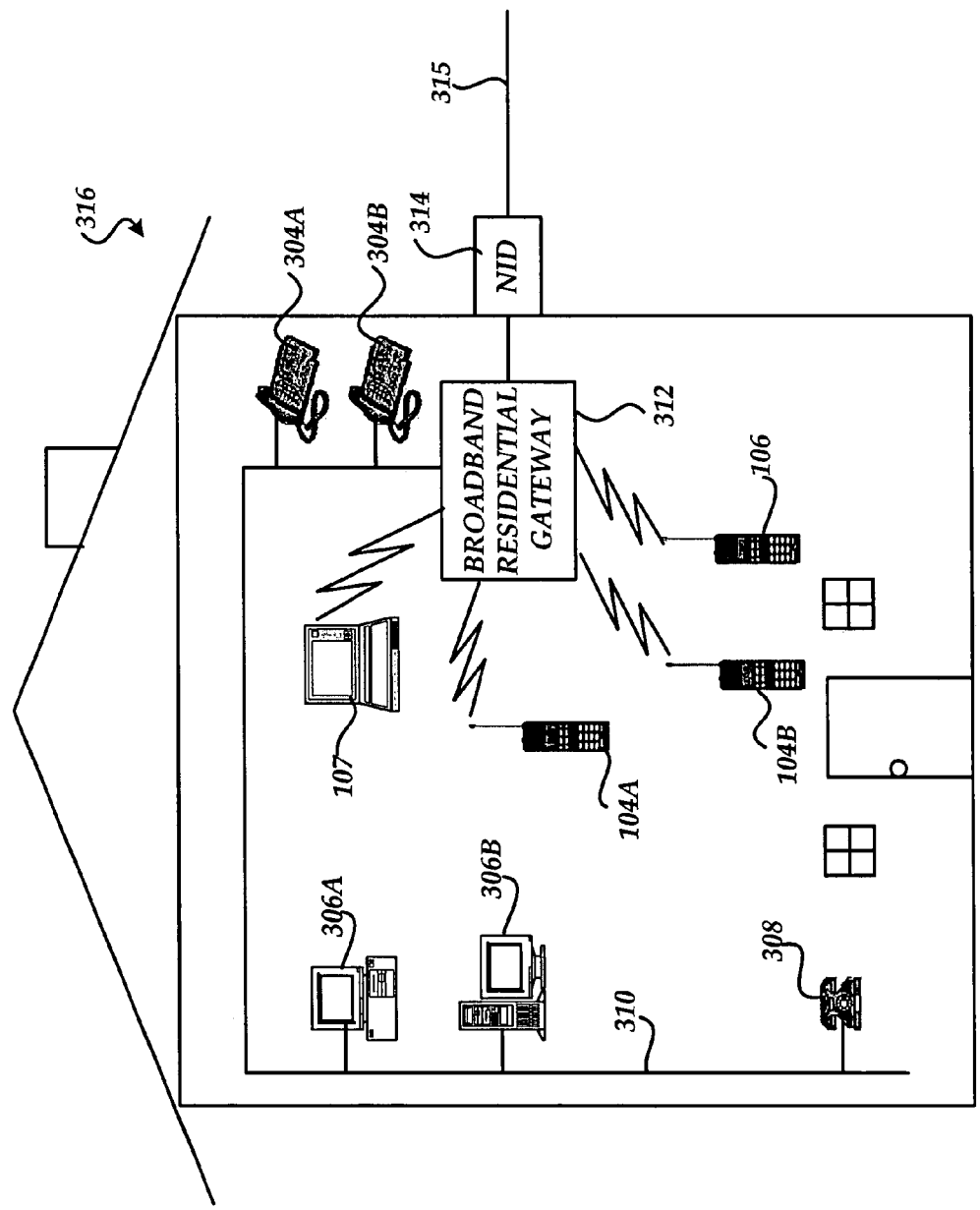
FIG. 3 illustrates a network architecture wherein an unlicensed/unregulated wireless access point is integrated for VoIP communications through a broadband residential gateway according to embodiments of the present invention.

FIG. 3 illustrates a public or private place 316, such as a user's residence, or business in greater detail to illustrate the use of a BRG 312 to provide voice and data services to digital cordless handsets 104A, 104B and dual mode telephone 106, and also to additional devices such as wired VoIP phones 304A, 304B. The wired VoIP phones 304A and 304B may be wired via a digital service line such as a DSL line where each phone may operate over a separate derived line operating through a single DSL line. The cordless/wireless telephones 104, 106 may operate through the same line as the phones 304A, 304B via the BRG 312 via wireless access points 215 integrated with the BRG 312. In the instance where the BRG is linked to the wired data network over a telephony connection, a copper pair 315 interconnects a Network Interface Device (NID) to a CO. At the CO, the data packets including the IP and VoIP are directed to the wired data network portion while any PSTN telephone signals are directed from the plain old telephone service (POTS) telephone 308 of the user to the PSTN. An alternative is to utilize a cable modem within the BRG 312 and the community access television (CATV) system is used to carry the data between the wired data network and the BRG 312.

The BRG 312 of this example shown includes a DSL modem linking the BRG 312 through the NID 314 to the CO over the copper pair 315. The BRG 312 includes routing functionality to accommodate multiple devices to form a local area network (LAN) for the location 316. The BRG includes a wireless access point to communicate over the unregulated wireless connection to the digital cordless handsets 104A, 104B, dual mode handset 106, and a wireless equipped personal computer 107. The BRG 312 also includes a wired access point to communicate over wired connections to VoIP phones 304A, 304B and personal computers 306A, 306B. The wired connection may be of various forms such as conventional Ethernet or over a home phoneline network alliance ("HPNA") connection. As shown, the wired connection is an HPNA connection over the copper pair telephone line 310 of the location 316. The copper pair telephone line 310 carries POTS signals of the POTS phone 308 as well as the data signals of the personal computers 306A, 306B and the VoIP phones 304A, 304B.

Each of the VoIP capable devices linked to the BRG 312 may be used to place telephone calls. Furthermore, each VoIP capable device may have its own telephone number so that multiple VoIP calls may occur to provide access to or be accessed from the wired data network through the BRG 312. Alternatively or in addition, a call to one telephone number may cause each of the VoIP phones to ring so that the call may be answered on any one of the phones. Thus, the MAC address/IP address of each phone may be associated with its own telephone number and/or a telephone number applicable to all phones of the location 316.

Each user of the location 312 may have his or her own SIM card to use in the VoIP capable device. As discussed above, the identity of the user is determined by the wired data network from the information of the SIM card, and any limitations on use for that individual may be applied. Thus, the application server of the wired data network may maintain a restrictions database where a parent may set forth restrictions on the use of the VoIP communications of children of a household. These restrictions as well as other options for the voice and data services may be set forth by the subscriber accessing the application server though a web interface provided to the personal computer 306A, 306B, or 107.

Operation Via a Wired Data Network Via Unlicensed Spectrum

Figure 4A:
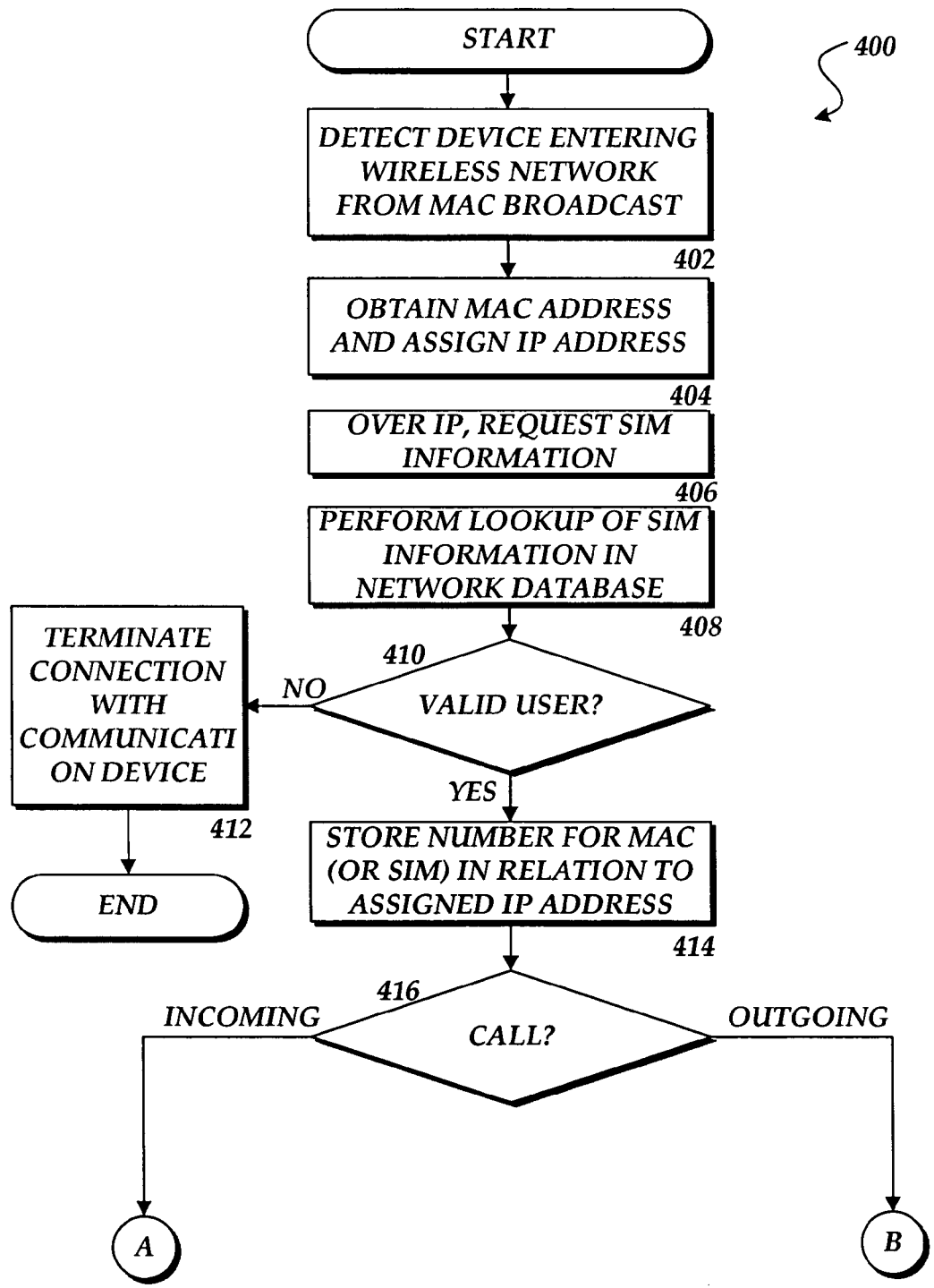
FIGS. 4A and 4B are flow diagrams illustrating a method according to embodiments of the present invention for utilizing VoIP communications via unlicensed/unregulated wireless connectivity through a wireless access point according to embodiments of the present invention.
Figure 4B:
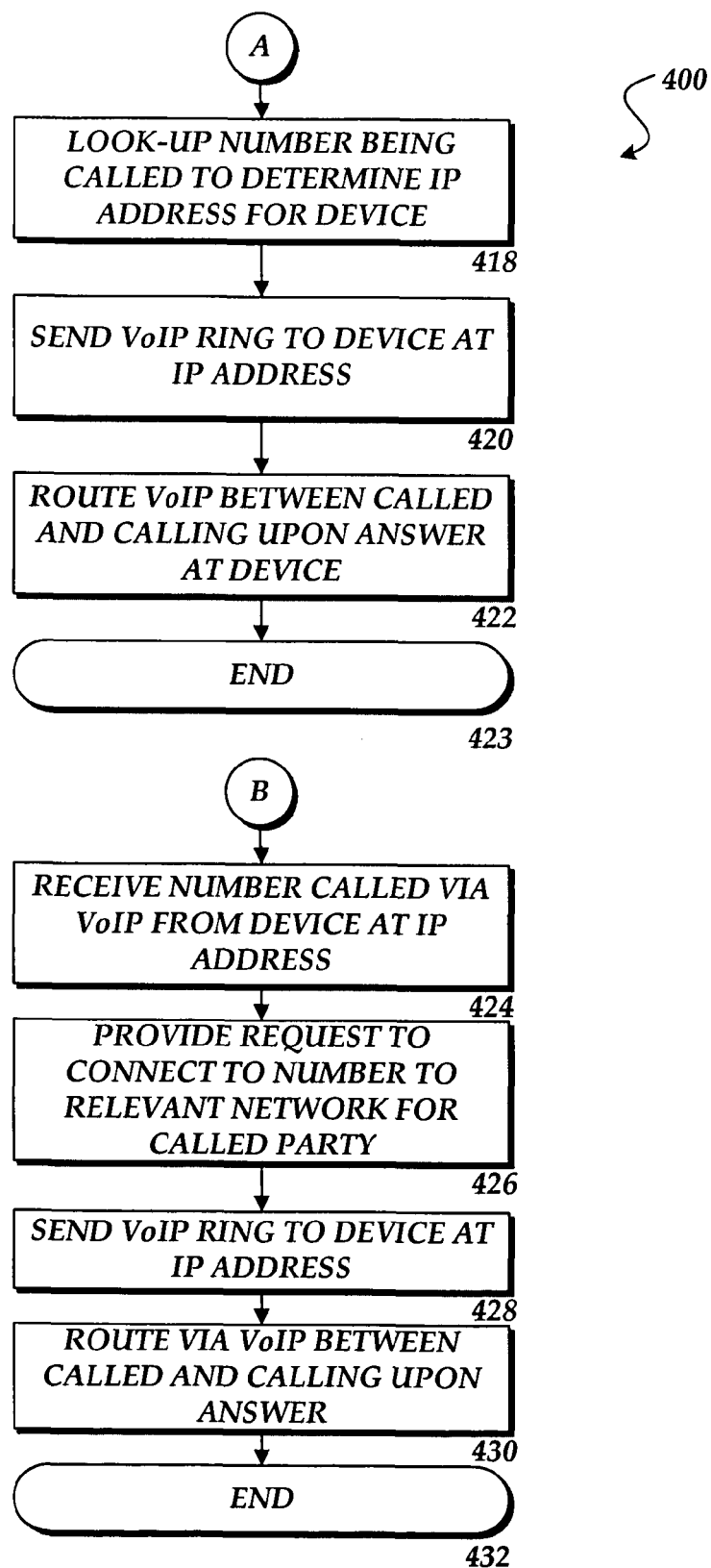

FIGS. 4A and 4B show an illustrative set 400 of logical operations for establishing voice and data services with a digital cordless handset 104. The method of accessing voice and data services via the digital cordless handset 104 described below is by way of example only and is not restrictive of other methods for accessing the wired data network via the handset 104. Other general methods for accessing the wired data network are described above. The logical operations begin at block 402 where the digital cordless handset 104 enters a service area. The wireless access point detects the handset device entering the wireless network from the MAC broadcast by the handset device. At block 404, the MAC address is obtained from the broadcast and an IP address is assigned to the handset having the MAC address. Depending upon the connectivity of the wireless access point to the wired data network, the IP address may be assigned at a local router or may be assigned at a remote router of the wired data network.

Once the IP address is assigned such that IP packets may be exchanged with the digital cordless handset, then the wired data network requests the SIM information from the handset over the IP connection at block 406. At block 408, a look-up of the SIM information is performed in a network database such as an HLR in the wired data network. A determination is made at block 410 about whether the user identified by the SIM information is a valid user based on the look-up in the database. The SIM information may not be found, thereby indicating the user is not a subscriber and should not be given access to the network. The connection with the handset is terminated at block 412 and the operations end.

Alternatively, the SIM information may be found by the look-up. The SIM information may correspond to a subscriber of the current service provider as noted by the SIM, or may correspond to a subscriber of other service providers as indicated by the SIM who is a guest user for the current service provider. Once a valid user has been found based on the look-up, the telephone number found from the look-up that is known for the MAC or SIM information identifying the handset is stored in relation to the assigned IP address at block 414. Now, the telephone number of the device is associated with the IP address so that incoming and outgoing calls can be effectively routed between the handset, the wired data network, and any other networks that are involved such as the PSTN.

At block 416, a determination is made as to whether the handset 104 is placing an outgoing call or whether there is an incoming call directed to the handset 104. When an incoming call is directed to the handset 104, the call is received in the wired data network, such as through the GMSC from the PSTN. A look-up is performed within the wired data network to determine the IP address that is associated with the called number at block 418. Upon determining the proper IP address, a VoIP ring to the handset 104 having the IP address is performed via a VoIP session at block 420 to alert the user of the handset 104 that there is an incoming call. The VoIP session may be initiated through operation of the SIP function that may be performed at the handset 104, or may also be provided by the wireless access point or BRG that is in communication with the handset 104. VoIP packets are then routed between the handset 104 and the wired data network at block 422 upon the user of the handset 104 answering the incoming call. The logical operations then end at block 423 once the call is finished.

When an outgoing call is being sent from the handset 104, a number being called is received into the wired data network. The number is received over a VoIP session with the IP address of the handset 104, such as a session established through the SIP function, at block 424. Upon receiving the dialed number at the wired data network, a request to connect is provided to the relevant network for the called party at block 426. For example, the number dialed may be a number reachable through the PSTN so that the GMSC linked to the wired data network routes the called number to the PSTN. This allows a connection to the desired telephone line identified by the telephone number to be established.

While the called party's telephone line is ringing, a VoIP ring may be transferred back to the handset 104 to provide the user with an indication that the called party's phone is ringing at block 428. Then, VoIP communications are routed between the handset and the wired data network at block 430 upon the called party answering the call from the handset 104. The logical operations then end at block 432 once the call is finished.

Operation of Single Telephone Number System

Figure 5:
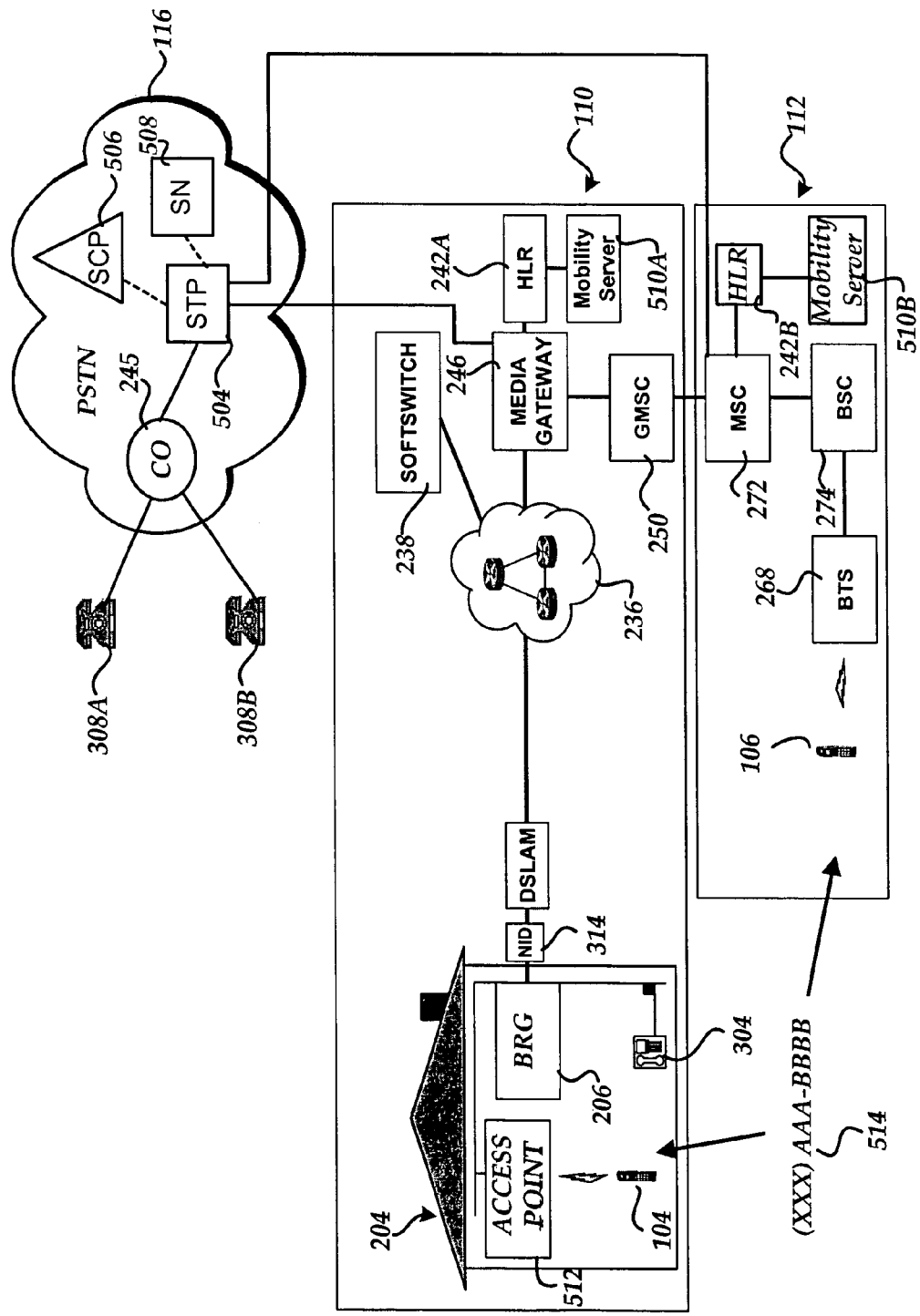
FIG. 5 illustrates a telecommunications architecture showing interaction between a wireline telecommunications system, a wireless telecommunication system, a broadband packet data network, and public switch telephone network according to embodiments of the present invention.

Referring now to FIG. 5, another embodiment of the invention will be described. According to this embodiment of the invention, a single telephone number is assigned to two or more handsets, each of which may be operated in a different telecommunications network. For instance, according to one embodiment of the invention, a first handset is operable for use with a unregulated wireless network, such as the unregulated wireless network 110. A second handset is operable for use with a regulated wireless network, such as the network 112. When a call is initiated to the single telephone number, both the handset operable for use with the unregulated wireless network 110 and the handset operable for use with the regulated wireless network 112 will be rung. Either handset may then be used to receive the incoming communication. Moreover, according to this embodiment of the invention, along with a single telephone number, a single personal voice mailbox that can be accessed from any of the handsets assigned to the single telephone number may be provided. A single bill for service for the single telephone number may also be provided to a subscriber of the single telephone number service.

According to other aspects of this embodiment of the invention, a single telephone number may be assigned to a wired handset, such as the handset 304, connected to a VoIP network. The handset 304 may be assigned an identical telephone number to a handset 106 or 108 operative for use with a regulated wireless network 112. When a user is in a home 204, called party identification and/or distinctive ringing may be associated with incoming calls on the handset 304 and incoming calls may be answered on any VoIP enabled handset in the home 204.

As discussed above, the handset 104, 106, 108 and the handset 304 are rung in a substantially simultaneous manner when an incoming call is received, such as from the handset 308A. When a user is in the home 204, outgoing calls may be made on the assigned telephone number from any handset in the home 204. Users are able to select the personal telephone number for outgoing calls via means provided by the handset 304. Moreover, users of the single number service can administer the service via a web browser equipped personal computer. In multi-user households, a user can administer which VoIP line rings on which VoIP phones. Additionally, other services may be provided. For instance, a parent may be able to place limits, such as the time of day and day of week and/or number of minutes, on a child's use of their personal telephone number, including both wireless access provided through the regulated wireless network 112 and wireline access provided through the unregulated wireless network 110.

Turning now to FIG. 5, additional details regarding the embodiment of the invention wherein a single telephone number is assigned for use with a plurality of handsets will be described. As shown in FIG. 5, the unregulated wireless network 110 may include one or more digital cordless telephones 104 for use with a wireless access point 512 and a broadband residential gateway 206. As discussed above, VoIP technology is utilized to send and receive telephone calls on the digital cordless phone 104 through the packet switched network 236. As also discussed above, a softswitch 238 may be utilized to provide various services to a user of the digital cordless phone 104. For instance, a voicemail service may be provided through the softswitch 238. Additionally, one or more wired handsets 304 are also connected to the BRG 206. Voice and data services may also be utilized through the wired handsets 304 in a manner similar to that provided through the digital cordless phone 104.

As also shown in FIG. 5, the unregulated wireless network 110 may be configured for interoperability with the regulated wireless network 112. In particular, according to one embodiment of the invention, a subscriber may be provided one or more digital cordless phones 104 and one or more wired handsets 304 for use with the network 110. The same subscriber may also be provided a handset 106, 108 operable for use with the regulated wireless network 112. For instance, a subscriber may be provided a cordless handset 104 for use with the access point 512 when in the home 204 and a handset 106, 108 for use with the regulated wireless network 112 when outside the home. In this embodiment of the invention, a single telephone number 514 may be assigned to the digital cordless phone 104 and the handset 106. When a communication is received that is directed toward the single telephone number 514, a ring tone is generated at the digital cordless phone 104 and at the handset 106. The ring tone may be generated substantially simultaneously at the digital cordless phone 104 and the handset 106.

According to other embodiments of the invention, a single telephone number may be assigned to both a handset 106, 108, 308A configured for wired use with the PSTN 116 and the digital cordless phone 104. As in the embodiments described above, a single telephone number 514 may be assigned to the handset 106, 108, 308A and the digital cordless phone 104. When an incoming call is directed toward the single telephone number 514, the handset 308A and the digital cordless phone 104 may be rung simultaneously.

In order to provide the functionality described herein for utilizing a single telephone number with multiple handsets, an interface is provided between the networks 110 and 112 and the PSTN 116. In particular, the media gateway 246 interfaces with a signal transfer point (STP) 24 via a communication link. The communication link may employ, for example, the signaling system 7 (SS7) switching protocol. The STP 24 may be a multi-port high speed packet switch that is programmed to respond to the routing information in the appropriate layer of the switching protocol and to route the data packets to their intended destinations. The MSC 272 of the network 112 may also similarly be connected to the STP 504 via a communication link.

One of the intended destinations of the data packets from the STP 504 is a service control point (SCP) 506. The STP 504 is in communication with the SCP 506 via a communication link, which may also employ the SS7 switching protocol. The SCP 506 may comprise an intelligent database server such as, for example, an intelligent network service control point available from LUCENT TECHNOLOGIES, INC., Murray Hill, N.J., and may have associated with it a network database for storing network data. The intelligent functionality of the SCP 506 may be realized by application programs, such as programmable service program applications (SPA), which are executed by the SCP 506. In addition, another of the functions of the SCP 506 is the hosting of a network database, which may store subscriber information, such as subscriber call management profiles used in providing enhanced calling services such as the single number telephone service of the present invention.

A typical local exchange carrier (LEC) also includes a number of central offices 245 for interconnecting customer premises terminating equipment with the PSTN 116, such as the handsets 308A-308B. The central office 245 may include one or more service switching point (SSP) switches. Each SSP switch has a number of subscriber lines connected thereto. The subscriber lines may be, for example, conventional twisted paired loop circuits connected between the switches and the telephone drops for the customer premises. Subscriber lines may also comprise trunk circuits, such as Ti trunk circuits. Typically, the number of subscriber lines connected to each switch is on the order of 10,000 to 100,000 lines. Each of the subscriber lines is connected to a terminating piece of customer premises equipment, represented in FIG. 5 by the handsets 308A-308B. Alternatively, the terminating equipment may be other types of telecommunications units such as, for example, a telecopier, a personal computer, a modem, or a private branch exchange (PBX) switching system.

The features of the PSTN 116 illustrated in FIG. 5 include a services node (SN) 508. The SN 508 may be, for example, a compact services node available from LUCENT TECHNOLOGIES, although the SN 508 may be any other type of available AIN-compliant SN. The SN 508 may be connected to one or more of the SSP switches via a communications link which may be, for example, an integrated service digital network (ISDN) connection, including basic rate interface or primary rate interface lines. According to other embodiments, the communications link may be, for example, a Ti trunk circuit. The SN 508 may be used primarily when some enhanced feature or service is needed that requires an audio connection to the call such as, for example, the call return and calling name services. Similar to the SCP 506, the intelligent functionality of the SN 508 may be realized by programmable applications executable by the SN 508.

In order to keep the processing of data and calls as simple as possible at the switches, such as the SSP switches contained in the central office 245, a set of triggers may be defined at the SSP switches for each call. A trigger is an event associated with a particular subscriber line that generates a query that is sent from the SSP switch servicing the particular subscriber line to the SCP 506 via the STP 504. The triggers may be originating triggers for calls originating from the subscriber premises or termination triggers for calls terminating at the subscriber premises. The trigger causes a message in the form of a query to be sent from the SSP switch to the SCP 506.

In response to receiving such a query, the SCP 506 in turns interrogates the network database stored at the SCP 506 to determine whether some customized call feature or enhanced service should be implemented for the particular call or whether conventional dialup telephone service should be provided. The results of the database inquiry are sent back for the SCP 506 to the SSP switch via the STP 504. The return packet includes instruction to the SSP switch as to how to process the call. The instructions may be to take some special action as a result of a customized calling service or enhanced feature. For example, for an enhanced calling feature requiring the capabilities of the SN 508, the return message from the SCP 506 may include instructions for the SSP switch to route the call to the SN 508. In addition, the return message from the SCP 506 may simply be an indication that there is no entry in the database that indicates anything other than conventional telephone service should be provided for the call. The query and return messages may be formatted, for example, according to conventional SS7 transaction capabilities application part formats. U.S. Pat. No. 5,438,568, which is hereby expressly incorporated by reference, discloses additional details regarding the functioning of an advanced intelligent network.

As will be discussed in greater detail below, a single telephone number may be assigned to multiple handsets utilized in conjunction with the PSTN 116, the unregulated wireless network 110, and the regulated wireless network 112. When a call is received and directed to a single telephone number, a termination attempt trigger is generated at the central office 245. In response thereto, a message is transmitted to the SCP 506 requesting further instructions on the handling of the incoming communication. Based on the content of the database stored at the SCP 506, the incoming communication is routed to the SN 508.

Once the call has been routed to the SN 508, an application program executing at the SN 508 initiates outgoing telephone calls to each of the handsets to which the single telephone number has been assigned. For instance, the SN 508 may initiate an outgoing communication to the digital cordless phone 104 and simultaneously initiate an outgoing communication to the handset 108. Similarly, if the single telephone number has been assigned to a traditional wired handset 308A connected to the PSTN 116 and a digital cordless phone 104 operative for use with the network 110, the SN 508 is operative to simultaneously initiate an outgoing communication to the handset 308A and the digital cordless phone 104 in response to the receipt of an incoming communication.

The SN 508 is further operative to determine whether the outgoing communications have been answered at either handset to which the communication was directed. If no answer is received at either of the handsets within a predetermined period of time, the SN 508 is operative to route the incoming communication to the softswitch 238 wherein a voicemail service may be provided. However, if the outgoing communication is answered at either the digital cordless phone 104 or the handset 108, the SN 508 is operative to route the incoming communication to the handset on which the call was received. The outgoing communication initiated by the SN 508 to the handset that was not utilized to answer the telephone call: is then dropped. It should be appreciated that the single telephone number service as described herein is described in the context of utilizing a single number with two handsets. However, using the methods described herein, the single number service may be extended to any number of additional handsets. Additional details regarding the operation of the single telephone number service will be provided below with respect to FIGS. 6A-6B.

Figure 6A:
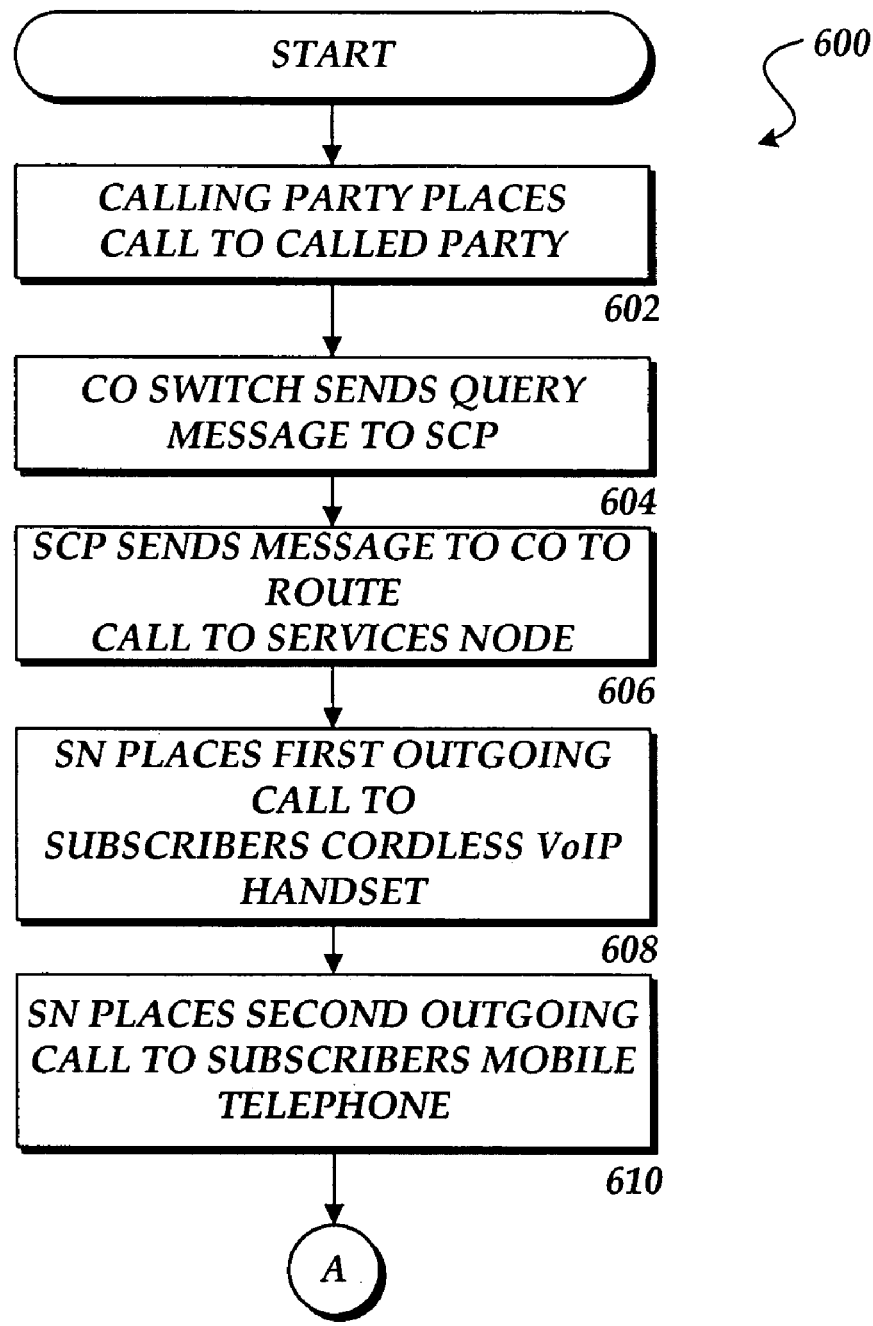
FIGS. 6A and 6B are flow diagrams illustrating a method for calling a wireless telecommunications device and a VoIP telecommunications device via a single telephone directory number according to embodiments of the present invention.
Figure 6B:
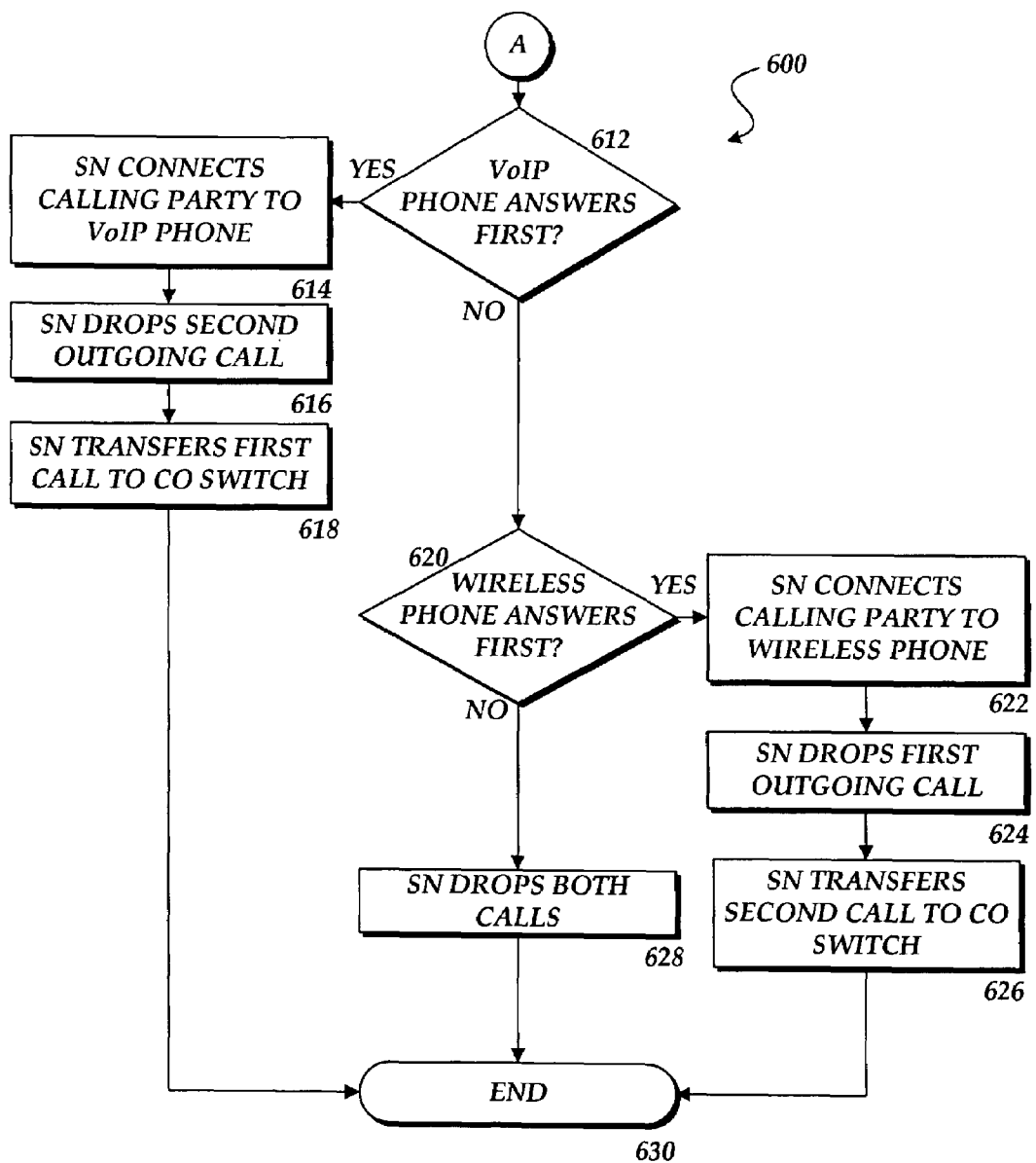

FIGS. 6A and 6B are flow diagrams illustrating a method for calling a wireless telecommunications device and a VoIP telecommunications device via a single telephone directory number according to embodiments of the present invention. Turning now to FIGS. 6A and 6B, an illustrative process flow for implementing a single telephone number service in various embodiments of the invention will be described. FIGS. 6A and 6B are described herein with reference to the PSTN 116, and the networks 110 and 112, shown and described above with respect to FIG. 5. In addition, the process illustrated in FIGS. 6A and 6B is described with reference to a subscriber utilizing the single number calling service with respect to a digital cordless phone 104 and a handset 108 that have been assigned the same phone number 514. It should be appreciated, however, that the single number service may be utilized with the digital cordless phone 104 and a wired telephone handset, such as the handsets 308A-308B.

Referring now to FIGS. 6A and 6B, the routine 600 begins at block 602 where a calling party places a call to the called party that is a subscriber to the single number telephone service. In order to initiate such a call, the calling party may utilize a handset, such as the handset 308A, to place a telephone call to the single telephone number 514 that has been assigned to the subscriber's handsets. The routine 600 then continues from block 602 to block 604, where a termination attempt is made at the subscriber's number. In response to the termination attempt being made, the CO switch 245 sends a query message to the SEP 506.

From block 604, the routine 600 continues to block 606, where the SCP 506 transmits a message to the CO 245 instructing the CO 245 to transmit the incoming communication to the SN 508. In response to the message, the CO 245 transfers the incoming communication from the handset 308A to the SN 508 for further processing. When the communication is received at the SN 508, the SN 508 places a first outgoing call to the subscriber's digital cordless phone 104. Substantially simultaneously thereto, the SN 508 places a second outgoing call to the subscriber's handset 108. It should be appreciated that, in order to account for delays in the processing of calls through a wireless network, the call to the handset 108 may be placed by the SN 508 prior to initiating the outgoing call to the digital cordless phone 104.

From block 610, the routine 600 continues to block 612, where the SN 508 makes a determination as to whether the subscriber's digital cordless phone 104 has been answered before the handset 108 has been answered. If the digital cordless phone 104 is answered prior to the answering of the handset 108, the routine 600 branches to block 614. Otherwise, the routine 600 continues to block 602, where a determination is made as to whether the handset 108 is answered by the subscriber or other user prior to answering the digital cordless phone 104. If the handset 108 is answered prior to the digital cordless phone 104, the routine 600 branches to block 622. Otherwise, the routine 600 continues to block 628, where both outgoing communications initiated by the SN 508 are dropped. It should be appreciated that a predetermined period of time may elapse prior to dropping the outgoing communications initiated by the SN 508. In addition, it should be appreciated that the incoming communication from the handset 308A may be routed by the SN 508 to a softswitch 238 for the delivery of voice mail services.

At block 614, the SN 508 connects the calling party to the digital cordless phone 104. The routine 600 then continues to block 616, where the SN 508 drops the outgoing call that was placed to the handset 108. Once the outgoing call placed to the handset 108 has been dropped, the SN 508 transfers the completed call to the CO 245. This occurs at block 618.

At block 622, the SN 508 connects the calling party to the handset 108. The routine 600 then continues to block 625, where the SN 508 drops the outgoing communication that was placed to the digital cordless phone 104. The routine 600 then continues to block 626 where the SN 508 transfers the completed call to the CO 245 for further processing. From blocks 618, 628, and 626, the routine 600 continues to block 630, where it ends.

Operation of Dual Mode Telephone

Another embodiment of the present invention provides integrated digital voice and data service that includes a seamless integration of wireless (mobile) access using licensed spectrum and cordless wired access using unlicensed spectrum via a dual mode telephone 106. The dual mode telephone 106 functions as a wireless phone operating over licensed wireless spectrum via a regulated wireless network 112 when a user is outside of buildings and as a digital cordless phone operating over unlicensed spectrum via the unregulated wireless network 110 with a wireless access point in conjunction with VoIP digital voice technology when a user is inside buildings, such as the user's home. In one embodiment, the dual mode telephone 106 operates as a GSM/GPRS handset when the user is outside and as an IEEE 802.11b handset when the user is inside buildings equipped with a wireless access point. According to this embodiment, the handset telephone 106 includes Session Initiation Protocol (SIP) software and includes a Subscriber Identity Module (SIM) card. The SIM card will be used to identify the user and the user's service provider.

Referring back to FIGS. 1, 2, and 3 the dual mode telephone 106 functions as a GSM/GPRS handset operating over licensed spectrum when the user is outside. When the user goes inside a building that is equipped with an 802.11b wireless access point or other wireless access, such as Bluetooth®, the telephone 106 functions as a cordless phone operating over unlicensed spectrum with the wireless access point (WAP) in conjunction with VoIP digital voice technology as described in detail with reference to FIGS. 2, 3. The 802.11b wireless access points in buildings are connected to the telecommunications service provider's broadband packet data network. When a user is inside a residence or other WAP equipped facility, an exemplary implementation is for the 801.11b wireless access point to be integrated into a Broadband Residential Gateway (BRG) 312 as described above. As described above, the dual mode telephone 106 may be equipped with a SIM card that will be used to identify the user and the user's service Provider. The user will be able to use the dual mode telephone 106 to "roam" within a service provider's network and to "roam" into other service providers' wireless access and wired access networks. That is, a user may operated the dual mode telephone 106 via any wireless access point of her service provider or via wireless access points of other service providers.

The voice and data functionality of the dual mode telephone 106, including the SIP software and SIM card, may be available to users in the form of a plug-in card that users can install in their laptop computers 107 or in Personal Data Assistants (PDAs). When equipped with the plug-in card, users will be able to use their laptop computer 107 or PDA, when equipped with an earpiece and microphone, to access the same voice and data services that they can access with a dual mode telephone 107.

When the dual mode telephone 106 is operating in the cordless wired access mode in conjunction with an 802.11b wireless access point, digital voice calls are placed and received using the SIP software contained in the telephone. Data services, such as directories and messaging services, may execute on applications servers 212 in a service provider's broadband packet data service network 114 as described for the telephone 104 above.

When the dual mode handset is operating in the wireless (mobile) mode via the regulated wireless network 112, it may operate as a GSM/GPRS telephone. GSM protocols may be used to place and receive voice calls. GPRS protocols may be used to access the same data services that are accessible when the dual mode telephone 106 is operating in the cordless wired access mode.

According to embodiments of the invention, each dual mode telephone 106 has a single telephone number that is used for both wireless (mobile) access and cordless wired access. When a user is engaged in a call outside their home/building using their dual mode handset and enters their home/building, the call may be automatically changed from the wireless mode to the digital cordless wired mode as described for telephone 104. When a user is engaged in a call inside their home/building using their dual mode telephone 106 and goes outside their home/building, the call may be automatically changed from the cordless wired access mode to the wireless mode.

The dual mode telephone 106 supports multiple users per household or other building or facility wherein each user may have a unique personal phone number and their own dual mode telephone 106. The user can administer the functionality of the telephone 106 via a web browser equipped personal computer. For example, a parent may put limits, such as time of day and day of week and/or number of minutes of use on each child's use of their personal telephone number/dual mode telephone 106. When a user is in their home, incoming calls to the user may be answered on their dual mode telephone 106 or any IP phone in the home. Called party identification may be associated with incoming calls by distinctive ringing and/or call announcement to distinguish to whom in the home or building the incoming call is directed.

When a user is in their home or business, outgoing calls may be made on their dual mode telephone 106 or any IP phone in the home. On IP phones, users may select their personal line for outgoing calls. The dual mode telephone handset 106 allows digital access to on-line directories via the wired data network 114, and the directories may include personal and business information. A user can administer and edit the on-line directories using their dual mode telephone 106 or a web browser equipped personal computer or PDA.

The dual mode telephone includes personalized voice mail, and the user may access their mailbox using their dual mode telephone 106 or any IP phone in their home. Advantageously, user experience associated with accessing and using voice and data services when operating the dual mode telephone 106 in either the wireless (mobile) access mode or the cordless wired access mode will be the same.

Having described a system architecture and operating environment for the dual mode telephone 106 described above with reference to FIGS. 1, 2 and 3, FIGS. 7A and 7B are flow diagrams illustrating an example operation of the dual mode telephone 106 according to embodiments of the present of invention. The method of accessing voice and data services via the dual mode handset 106 described below is by way of example only and is not restrictive of other methods for accessing the wired data network via the dual mode handset 106. Other general methods for accessing the wired data network are described above. The operation 700 begins at block 702 where a user operates the dual mode telephone 106 device via the regulated wireless network 112 and engages in an in-progress telephone call. As should be appreciated, the telephone call may be operated through any suitable regulated wireless network 112 including a global system for mobile communications (GSM)/general packet radio service (GPRS) wireless communications environment. At block 704, the user engaged in an in-progress telephone, as described above, enter an area equipped for unregulated/unlicensed wireless connectivity. As described above, the user may have entered into her home, a business, a school, a leisure activity center, and the like that has been equipped with wireless access points for allowing communications over an unregulated wireless network 110 through a wire data network via voice over Internet protocol communication. According to an embodiment of the present invention, the dual mode telephone 106 contains hard-wired or software instructions sufficient to detect the availability of the alternate connectivity source in the form of the unregulated wireless network 110 via the wireless access points. That is, signaling detected by the telephone 106 from the unregulated wireless network 110 allows the telephone 106 to know that the unregulated wireless network 112 is available for use by the telephone 106.

At block 706, the wireless access point detects the handset device entering the wireless network from the MAC broadcast by the handset device. At block 708, the MAC address is obtained from the broadcast and an IP address is assigned to the handset having the MAC address. Depending upon the connectivity of the wireless access point to the wired data network, the IP address may be assigned at a local router or may be assigned at a remote router of the wired data network.

Once the IP address is assigned such that IP packets may be exchanged with the digital cordless handset, then the wired data network requests the SIM information from the handset over the IP connection at block 710. At block 712, a look-up of the SIM information is performed in a network database such as an HLR in the wired data network. A determination is made about whether the user identified by the SIM information is a valid user based on the look-up in the database. The SIM information may not be located which indicates the user is not a subscriber and should not be given access to the network. If the user is not validated, as described, the connection with the handset is terminated at block 412 and the operations end.

Alternatively, the SIM information may be found by the look-up. The SIM information may correspond to a subscriber of the current service provider as noted by the SIM, or may correspond to a subscriber of other service providers as indicated by the SIM who is a guest user for the current service provider. Once a valid user has been found based on the look-up, the telephone number found from the look-up that is known for the MAC or SIM information identifying the handset is stored in relation to the assigned IP address.

Figure 7A:
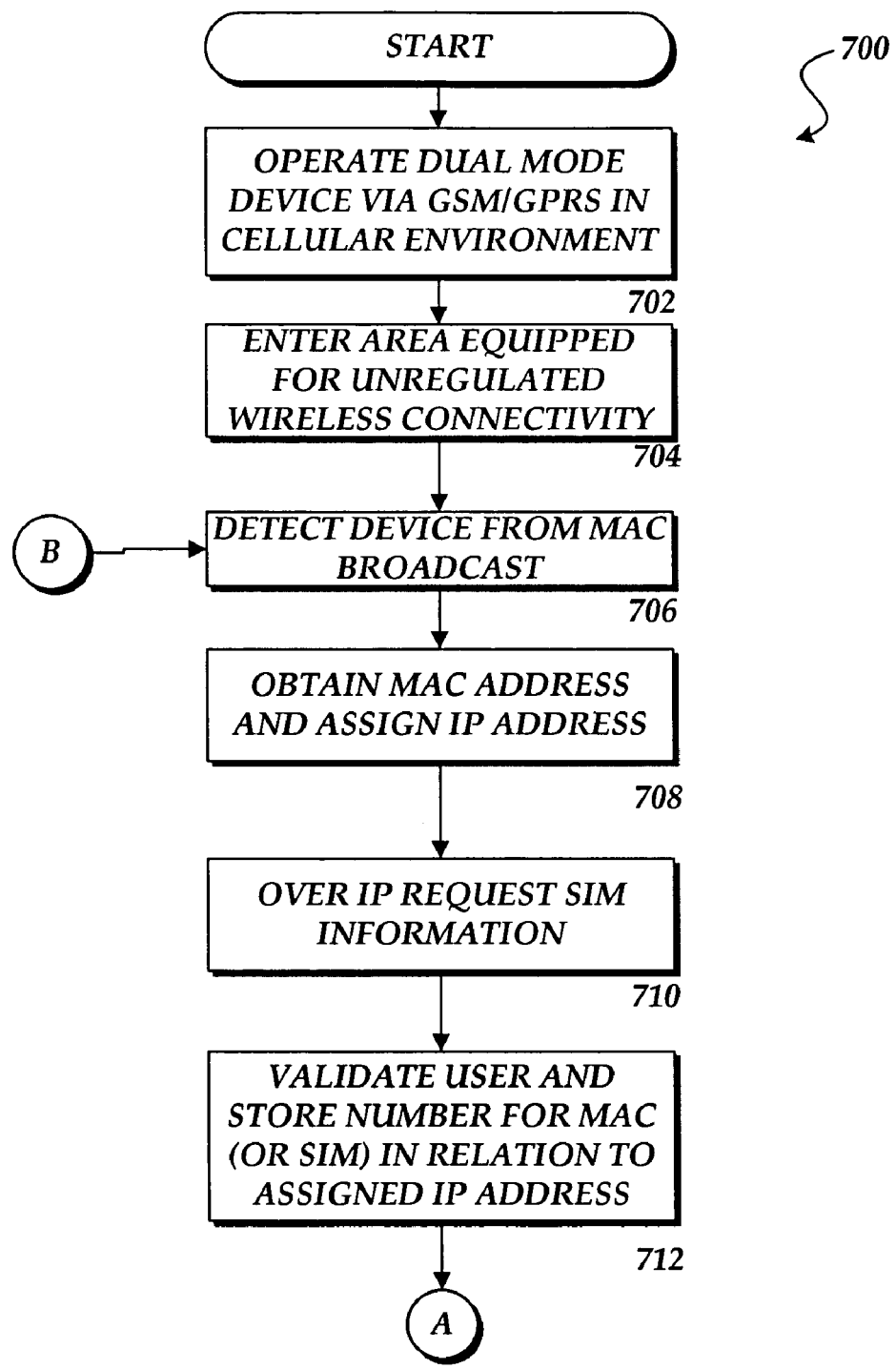
FIGS. 7A and 7B are flow diagrams illustrating a method for operating a dual mode telecommunications device according to embodiments of the present invention.
Figure 7B:
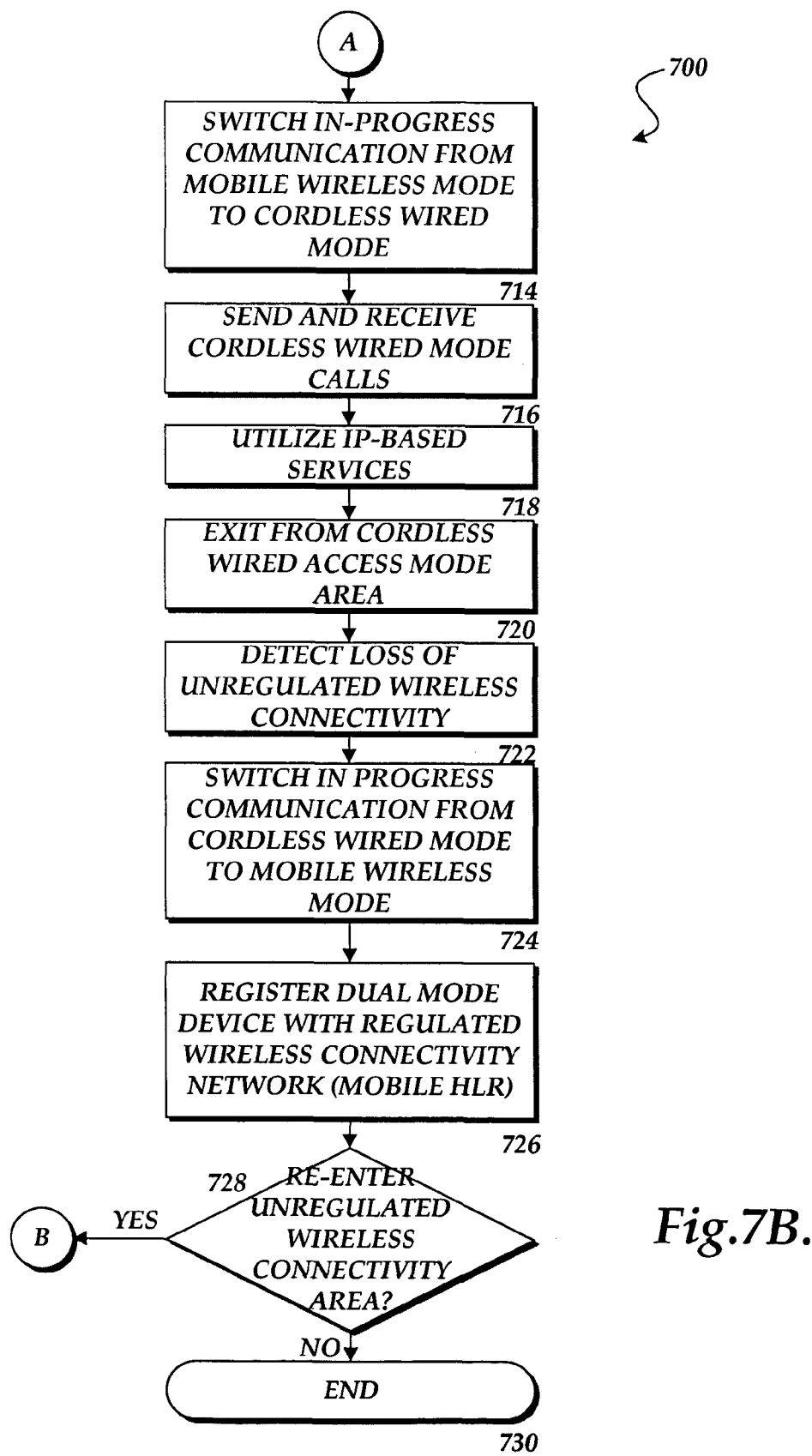

At block 714, FIG. 7B, the in-progress call automatically switches from the mobile wireless mode via the regulated wireless network 112 to the cordless wired mode through the wireless access points into the unregulated wireless network 110 for voice over Internet protocol communications through the wired data network 114. At block 716, the user may now complete the in-progress call and send and receive subsequent calls via the cordless wired mode through the unregulated wireless network 110. Advantageously, if the building in which the user is operating receives poor transmission quality to and from the regulated wireless network 112, the user receives a better calling experience once the dual mode telephone 106 is transitioned from the mobile wireless mode to the cordless wired mode, as described below.

At block 718, the user may now utilize a wide range of Internet protocol-based services owing to the availability of data services available through the transmission over an Internet protocol through the wired data network 114. For example, as described above, the user may utilize web-based user administration for administering the user's call services. The user may obtain and utilize a variety on-line services such as on-line telephone directories and personalized voice mail. The user may also utilize other electronic devices besides the telephone 106, such as the computer 107, which is illustrative of a laptop computer, a desktop computer, a personal digital assistant, or other computing device where the user may obtain digital services via the unregulated wireless network 110 or the user may obtain voice over Internet protocol voice services by equipping the computing device 107 with an earpiece and microphone to access the same voice and data services that the user may access the dual mode telephone 106.

At block 720, according to an embodiment of the present invention, the user exits from the unregulated wireless network 110 whereby the user removes the dual mode telephone 106 from the range of a wireless access point allowing access to the unregulated wireless network 110. For example, the user may exit from her home, a business, or other structure having wireless access points for communications with the unregulated wireless network 110. At block 722, the dual mode telephone 106 detects the loss of the unregulated wireless network connectivity. At block 724, the dual mode telephone 106 detects the availability of connectivity through the regulated wireless network 112. Accordingly, any in-progress communications by the user through the cordless wired mode via the unregulated wireless network 110 are switched automatically to a mobile wireless mode via the regulated wireless network 112.

At block 726, the dual mode telephone 106 is registered with the regulated wireless connectivity network 112 by registering its presence in the network via a home location register (HLR) of the regulated wireless network 112. At block 728, a determination is made as to whether the dual mode telephone 106 reenters the operating range of the unregulated wireless network 110 such as the case where the telephone 106 is carried by a user into a home, public or other private structure having wireless access points for communication between the dual mode telephone 106 and the wired data network via the unregulated wireless network 110. If not, the method ends at block 730. If the telephone 106 has re-entered the operating area of the unregulated wireless network 110, operation proceeds back to block 706 for connectivity of the dual mode telephone 106 via the unregulated wireless network 110, as described above.

As described herein, methods and systems are provided for operation of a digital cordless telephone via voice over Internet protocol and data over Internet protocol through a wired data network through an unregulated wireless network by access through one or more wireless access points. Methods and systems are also provided for utilizing a single telephone directory number for a digital cordless telephone and for a separate mobile wireless telephone for providing ease of use between the separate telephone devices and for providing more simple and common customer billing. Also provided are methods and systems for utilizing a dual mode telephone for operation via regulated wireless network and for operating via an unregulated wireless network for operation through a wired data network.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A system for providing a single telephone number for use with a digital cordless handset and with a second handset, the system comprising:
   a wireless access point wired to a wired data network that provides voice and data services, the wireless access point having a means for communicating with the digital cordless handset via a wireless connection, to provide the digital cordless handset wireless access to the wired data network; and
   a media gateway having:
   means for interfacing with a data switch, the data switch including programming means to respond to routing information in a layer of a switching protocol to route data packets to at least one of the digital cordless handset or the second handset;
   means for enabling the wireless access point to generate a ring tone at the digital cordless handset, wherein a call directed toward the second handset is received at the media gateway, and the telecommunications network generates a ring tone at the second handset, the ring tone generated at the second handset corresponding to the call at the second handset, the second handset being communicatively coupled to the telecommunications network; and
   means for linking the telecommunications network to the wired data network, wherein the digital cordless handset and the second handset are assigned the single telephone number,
   wherein the means for communicating is wired to the wired data network through a broadband residential gateway, the broadband residential gateway comprising: a broadband modem and a router, and being configured to enable another means for communicating to connect to the wired data network.

2. The system of claim 1, wherein the ring tone at the digital cordless handset, and the ring tone generated at the second handset are generated substantially simultaneously.

3. The system of claim 1, wherein the telecommunications network comprises a public switched telephone network.

4. The system of claim 3, wherein the second handset comprises at least one wired handset connected to the public switched telephone network.

5. The system of claim 1, wherein the telecommunications network comprises a wireless telecommunications network comprising means for providing wireless telecommunications on wireless communications frequencies.

6. The system of claim 5, wherein the second handset comprises means for communicating with the wireless telecommunications network via the wireless communications frequencies.

7. The system of claim 5, wherein the wireless communications frequencies comprise regulated wireless communications frequencies.

8. The system of claim 7, wherein the regulated wireless communications frequencies comprise frequencies assigned to a service provider.

9. The system of claim 1, wherein the means for communicating provides voice-over-internet protocol (VoIP) service to the digital cordless handset.

10. The system of claim 1, wherein the means for communicating uses subscriber identity module (SIM) information from the digital cordless handset to determine if a user associated with the digital cordless handset is a subscriber to the wired data network.

11. The system of claim 1, wherein the wireless connection comprises an unregulated wireless connection.

12. The system of claim 11, wherein the unregulated wireless connection comprises a connection providing wireless service using at least one frequency not assigned to a service provider.

13. The system of claim 1, wherein the data switch comprises a signal transfer point (STP).

14. A method for providing a single telephone number for use with a plurality of handsets, the method comprising:
assigning the single telephone number to a first handset of the plurality of handsets, the first handset being communicatively coupled to a first telecommunications network, wherein the first telecommunications network comprises one or more wireless access points wired to a wired data network through at least one broadband residential gateway including at least one broadband modem and at least one router and configurable to enable other wireless access points to connect to the wired data network, wherein the wired data network provides voice and data services;
assigning the single telephone number to a second handset of the plurality of handsets, the second handset being communicatively coupled to a second telecommunications network;
providing, for the first handset, via a wireless connection from the one or more wireless access points, wireless access to the wired data network; and
enabling a media gateway to:
receive a call directed toward the second handset, the second handset being associated with the single telephone number and being communicatively coupled to the second telecommunications network;
interface with a data switch for routing information in a layer of a switching protocol to at least one of the first handset or the second handset;
enable one of the one or more wireless access points to generate a ring tone at the first handset, and the second telecommunications network to generate a ring tone at the second handset corresponding to the call at the second handset; and
link the second telecommunications network to the wired data network.

15. The method of claim 14, further comprising:
detecting an incoming communication from a calling party to the single telephone number; and
placing outgoing communications to the first handset and the second handset in response to detecting the incoming communication.

16. The method of claim 15, further comprising: connecting the incoming communication to a first one of the first handset or the second handset to be answered.

17. The method of claim 16, further comprising: dropping each of the outgoing communications other than a one of the outgoing communications associated with the first one of the first handset or the second handset to be answered.

18. The method of claim 14, wherein the first handset comprises a digital cordless handset for communicating with the one or more wireless access points via the wireless connection.

19. The method of claim 14, wherein the second telecommunications network comprises a wireless network providing wireless telecommunications on wireless communications frequencies.

20. The method of claim 19, wherein the second handset comprises a wireless device communicating with the wireless network via the wireless communications frequencies.

21. The method of claim 19, wherein the wireless communications frequencies comprise regulated wireless communications frequencies.

22. The method of claim 21, wherein the regulated wireless communications frequencies comprise frequencies assigned to a service provider.

23. The method of claim 14, wherein the second telecommunications network comprises a public switched telephone network.

24. The method of claim 23, wherein the second handset comprises a wired handset connected to the public switched telephone network.

25. The method of claim 14, wherein the wireless connection comprises an unregulated wireless connection.

26. The method of claim 25, wherein the unregulated wireless connection comprises a connection providing wireless service using at least one frequency not assigned to a service provider.

27. A system for providing a single telephone number for use with a digital cordless handset and with a second handset, the system comprising:
means for receiving an incoming call directed to the single telephone number, wherein the single telephone number is assigned to the digital cordless handset and the second handset;
means for routing the incoming call to the digital cordless handset, wherein the digital cordless handset communicates, via a wireless connection, with a wireless access point wired to a wired data network through at least one broadband residential gateway including at least one broadband modem and at least one router to provide the digital cordless handset wireless access to the wired data network, wherein the wireless access point is adapted to enable other wireless access points to connect to the wired data network, and wherein the wired data network provides voice and data services;
means for routing the incoming call to the second handset, the second handset being communicatively coupled to a telecommunications network; and means for enabling a media gateway to:
  receive a call directed toward the second handset, the second handset being associated with the single telephone number and the telecommunications network;
  interface with a data switch for routing information in a layer of a switching protocol to at least one of the digital cordless handset or the second handset;
  enable the wireless access point to generate a ring tone at the digital cordless handset, and the telecommunications network to generate a ring tone at the second handset, the ring tone at the second handset being associated with the call directed toward the second handset; and
  link the telecommunications network to the wired data network.

28. The system of claim 27, further comprising:
  means for placing outgoing communications to the digital cordless handset and the second handset in response to receiving the incoming call directed to the single telephone number; and
  means for connecting the incoming call to a first one of the digital cordless handset or the second handset to be answered.

29. The system of claim 28, further comprising means for dropping each of the outgoing communications other than a one of the outgoing communications associated with the first one of the digital cordless handset or the second handset to be answered.

30. The system of claim 27, wherein the wireless connection comprises an unregulated wireless connection.

31. The system of claim 30, wherein the unregulated wireless connection comprises a connection providing service using at least one frequency not assigned to any service provider.

32. A media gateway comprising:
  means for enabling a wireless access point to generate a ring tone at a digital cordless handset;
  means for interfacing with a data switch for routing information in a layer of a switching protocol to at least one of the digital cordless handset or a second handset;
  means for linking a telecommunications network to a wired data network configured to provide voice and data services, the telecommunications network generating a ring tone at the second handset, the ring tone at the second handset corresponding to a call directed toward the second handset, wherein the digital cordless handset and the second handset are assigned a single telephone number, the second handset being communicatively coupled to the telecommunications network, and the wireless access point being wired to the wired data network and communicating, via a wireless connection, with the digital cordless handset to provide wireless access to the wired data network; and
  means for receiving the call directed toward the second handset corresponding to the single telephone number on the telecommunications network,
  wherein the wireless access point is wired to the wired data network through a broadband residential gateway, the broadband residential gateway comprising: a broadband modem and a router, and being configured to enable another wireless access point to connect to the wired data network.

33. The media gateway of claim 32, wherein the ring tone at the digital cordless handset, and the ring tone at the second handset are generated substantially simultaneously.

34. The media gateway of claim 32, wherein the telecommunications network comprises a public switched telephone network.

35. The media gateway of claim 34, wherein the second handset comprises a wired handset connected to the public switched telephone network.

36. The media gateway of claim 32, wherein the telecommunications network comprises a wireless telecommunications network providing wireless telecommunications on wireless communications frequencies.

37. The media gateway of claim 36, wherein the second handset comprises a wireless device communicating with the wireless telecommunications network via the wireless communications frequencies.

38. The media gateway of claim 32, wherein the wireless access point provides voice-over-internet protocol (VOIP) service to the digital cordless handset.

39. The media gateway of claim 32, wherein the wireless access point uses subscriber identity module (SIM) information from the digital cordless handset to determine if a user associated with the digital cordless handset is a subscriber to the wired data network.

40. The media gateway of claim 32, wherein the wireless connection comprises an unregulated wireless connection.

41. The media gateway of claim 40, wherein the unregulated wireless connection comprises a connection providing wireless service using at least one frequency not assigned to a service provider.

* * * * *